(12) United States Patent
Mehra et al.

(10) Patent No.: US 10,636,443 B2
(45) Date of Patent: *Apr. 28, 2020

(54) EMBEDDED DISCONNECTED CIRCUITS IN MAGNETIC STORAGE MEDIA OF DATA STORAGE DEVICES

(71) Applicant: Western Digital Technologies, Inc., San Jose, CA (US)

(72) Inventors: Pankaj Mehra, San Jose, CA (US); Bernd Lamberts, San Jose, CA (US); Sridhar Chatradhi, San Jose, CA (US); Jordan A. Katine, Mountain View, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,360

(22) Filed: Jun. 26, 2018

(65) Prior Publication Data

US 2018/0373452 A1 Dec. 27, 2018

Related U.S. Application Data

(60) Provisional application No. 62/525,272, filed on Jun. 27, 2017.

(51) Int. Cl.
*G11B 5/66* (2006.01)
*G11B 5/82* (2006.01)
(Continued)

(52) U.S. Cl.
CPC .............. *G11B 5/66* (2013.01); *G11B 5/4886* (2013.01); *G11B 5/4976* (2013.01); *G11B 5/746* (2013.01); *G11B 5/82* (2013.01); *G11B 5/667* (2013.01)

(58) Field of Classification Search
None
See application file for complete search history.

(56) References Cited

U.S. PATENT DOCUMENTS

| | | | |
|---|---|---|---|
| 6,249,824 B1 | 6/2001 | Henrichs | |
| 6,947,235 B2 | 9/2005 | Albrecht et al. | |
| (Continued) | | | |

OTHER PUBLICATIONS

D. Suess, T. Schrefl, M. A. Bashir, "Multilevel 3D Magnetic Recording," accessed May 9, 2018 (available at https://www.tuwien.ac.at/fileadmin/t/t-transfer/Dokumente/Ertinderservice/Technology_Offers_27.6.12/Technology_Offer_3DMagneticRecording.pdf).

(Continued)

*Primary Examiner* — Craig A. Renner
(74) *Attorney, Agent, or Firm* — Jacobsen IP Law; Krista S. Jacobsen

(57) ABSTRACT

Disclosed herein are magnetic storage media with embedded disconnected circuits, and magnetic storage systems comprising such media. A magnetic storage media comprises a recording layer comprising a storage location, and an embedded disconnected circuit (EDC) configured to assist in at least one of writing to or reading from the storage location in response to a wireless activation signal. A magnetic storage system comprises a signal generator configured to generate a wireless activation signal, a magnetic storage media with a plurality of storage locations, and a write transducer and/or a read receiver. The magnetic storage media has at least one EDC configured to assist in writing to and/or reading from at least one of the plurality of storage locations in response to the wireless activation signal.

45 Claims, 17 Drawing Sheets

(51) Int. Cl.
*G11B 5/48* (2006.01)
*G11B 5/74* (2006.01)
*G11B 5/49* (2006.01)
*G11B 5/667* (2006.01)

(56) References Cited

U.S. PATENT DOCUMENTS

| | | | |
|---|---|---|---|
| 7,324,294 | B2 | 1/2008 | Moser |
| 8,202,636 | B2 | 6/2012 | Choe et al. |
| 9,001,466 | B2 | 4/2015 | Sato et al. |
| 9,130,144 | B2 | 9/2015 | Yang et al. |
| 9,697,857 | B1 | 7/2017 | Ahner et al. |
| 9,779,770 | B1 | 10/2017 | Nolan et al. |
| 9,799,362 | B1 | 10/2017 | Lee et al. |
| 2003/0007442 | A1 | 1/2003 | Henrichs |
| 2004/0067390 | A1* | 4/2004 | Koda et al. ........... G11B 5/667 428/832.2 |
| 2004/0185308 | A1* | 9/2004 | Koda et al. ........... G11B 5/66 428/832.2 |
| 2006/0010463 | A1* | 1/2006 | Oshima et al. .... G11B 23/0042 720/718 |
| 2006/0072241 | A1 | 4/2006 | Feliss et al. |
| 2007/0171772 | A1 | 7/2007 | Oshima et al. |
| 2008/0117545 | A1 | 5/2008 | Batra et al. |
| 2009/0239468 | A1 | 9/2009 | He et al. |
| 2009/0294899 | A1 | 12/2009 | Pagaila et al. |
| 2010/0309577 | A1 | 12/2010 | Gao et al. |
| 2011/0019305 | A1 | 1/2011 | Süss et al. |
| 2013/0070361 | A1 | 3/2013 | Yang et al. |
| 2014/0136415 | A1 | 5/2014 | Ramachandran et al. |
| 2015/0243315 | A1 | 8/2015 | Fukuzawa et al. |
| 2015/0253404 | A1 | 9/2015 | Tomiha et al. |
| 2016/0117109 | A1 | 4/2016 | Patel |
| 2019/0006891 | A1 | 1/2019 | Park et al. |

OTHER PUBLICATIONS

R. Sato, H. Suto, T. Kanao, T. Nagasawa, and K. Mizushima, "3D Magnetic Recording Based on MAMR Technology," accessed May 9, 2018 (available at www.nims.go.jp/mmu/tmrc2017/att/E3.pdf).

International Search Report and Written Opinion from PCT Application No. PCT/US2018/039234 (filed Jun. 25, 2018), dated Oct. 17, 2018.

Office Action from U.S. Appl. No. 16/018,915, dated Oct. 3, 2019.

\* cited by examiner

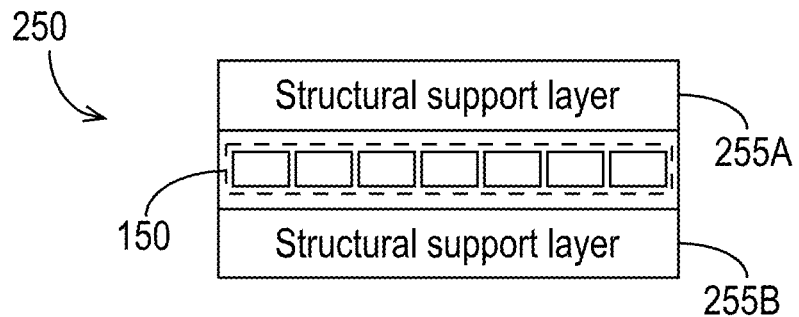
FIG. 2E
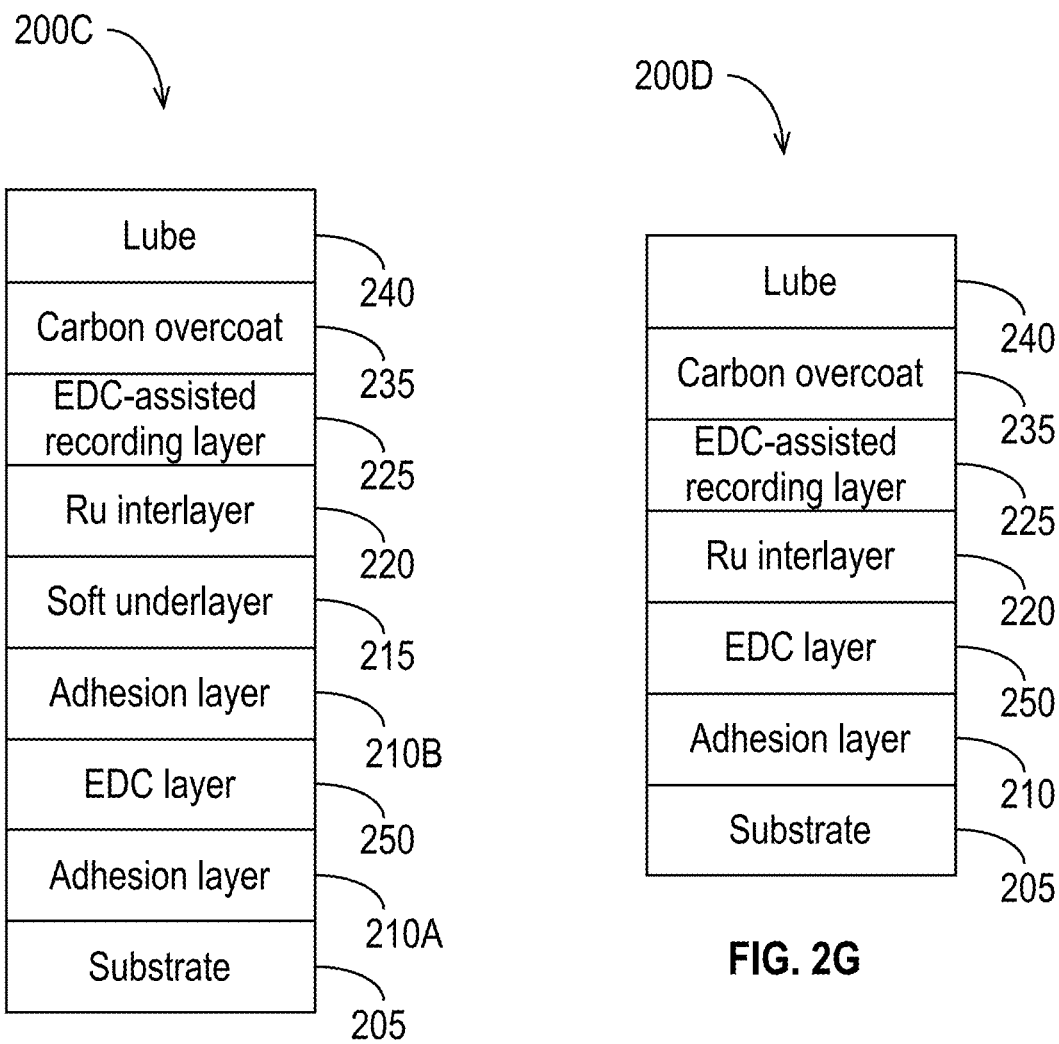
FIG. 2F
FIG. 2G

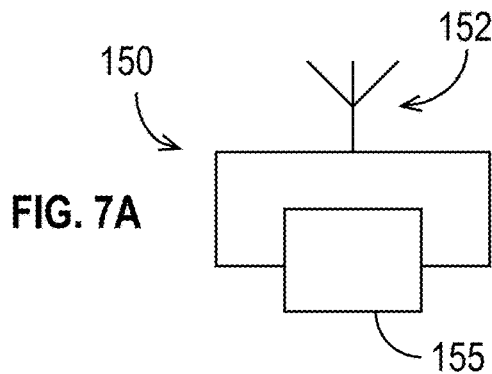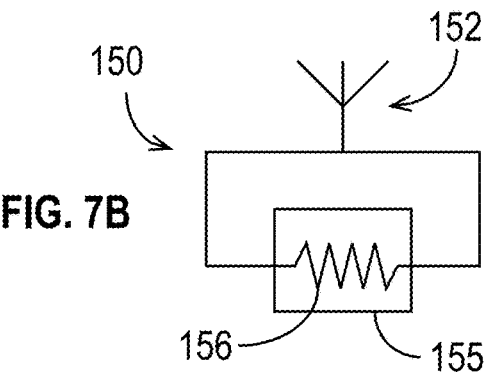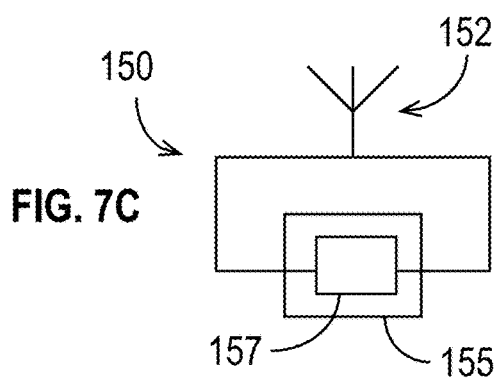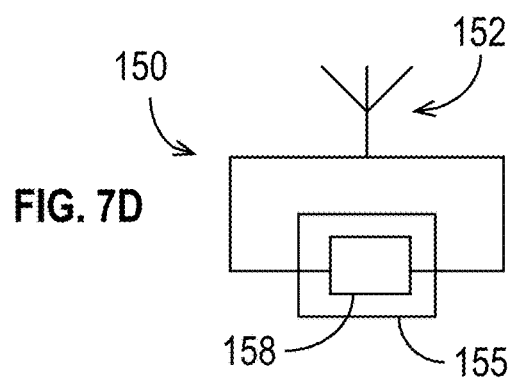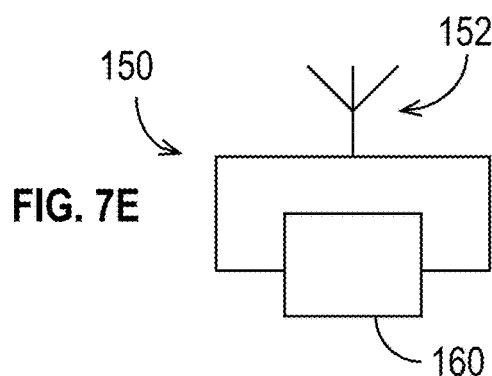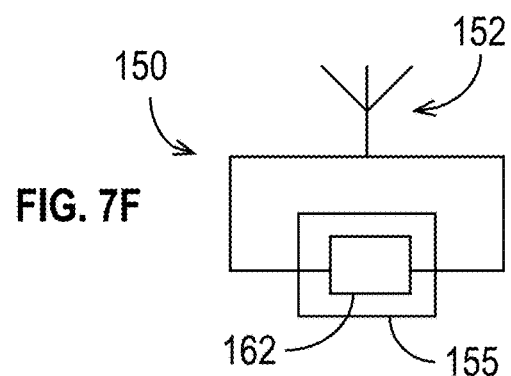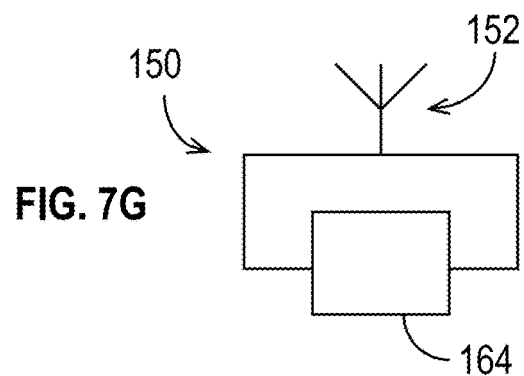

EMBEDDED DISCONNECTED CIRCUITS IN MAGNETIC STORAGE MEDIA OF DATA STORAGE DEVICES

CROSS-REFERENCE TO RELATED APPLICATIONS

This application claims the benefit of, and hereby incorporates by reference the entirety of the contents of, U.S. Provisional Application No. 62/525,272, filed Jun. 27, 2017 and entitled "EMBEDDED DISCONNECTED PASSIVE CIRCUITS IN DATA STORAGE DEVICES." This application is being filed on the same day as, and hereby incorporates by reference the entirety of for all purposes, U.S. application Ser. No. 16/018,915, entitled "METHODS OF USING EMBEDDED DISCONNECTED CIRCUITS IN MAGNETIC STORAGE MEDIA OF DATA STORAGE DEVICES".

BACKGROUND

Data storage devices (such as, for example, disk drives) enable the storage of large amounts of information in a small physical space. As areal densities have increased, the sizes of write tracks and, therefore, write transducers have decreased accordingly. As a consequence, the amount of flux generated by the write transducer decreases, which means the head carrying the write transducer must fly closer to the surface of the disk in order to record data on the disk. As the head flies closer to the surface of the disk, which is not entirely smooth and/or may pick up particles that stick to its surface, the head can sometimes contact the disk, which may damage the head, the disk, or both, or it may result in read or write errors.

Solid-state storage devices (SSDs) (i.e., devices that store data electrically rather than magnetically) provide arrays of storage cells that are addressable and do not require moving parts, such as a head to fly over the media to write and read data. SSDs require addressing lines, however, which reduce the amount of space on the device available for the storage of data.

There is, therefore, an ongoing need for improvements to data storage devices.

SUMMARY

This summary represents non-limiting embodiments of the disclosure.

Disclosed herein are systems and methods using embedded disconnected circuits (EDC) within a data storage media and using the EDC to write to and read from the data storage media (e.g., a hard disk or other storage media). One or more components of an EDC are energized by an electromagnetic field (of which there are many varieties, including, by way of example and not limitation, optical and radio waves) received by an antenna of the EDC. The energized EDC may be used to read and/or write data to storage locations of the media as described herein.

BRIEF DESCRIPTION OF THE DRAWINGS

Objects, features, and advantages of the disclosure will be readily apparent from the following description of certain embodiments taken in conjunction with the accompanying drawings in which:

FIG. 2E illustrates an exemplary EDC layer in accordance with some embodiments.

FIG. 2F illustrates a cross-sectional view of another exemplary layered media stack that includes an EDC layer in accordance with some embodiments.

FIG. 2G illustrates a cross-sectional view of another exemplary layered media stack that includes an EDC layer in accordance with some embodiments.

FIGS. 7A-7G illustrate various exemplary embedded disconnected circuits in accordance with some embodiments.

DETAILED DESCRIPTION

Figure 1:
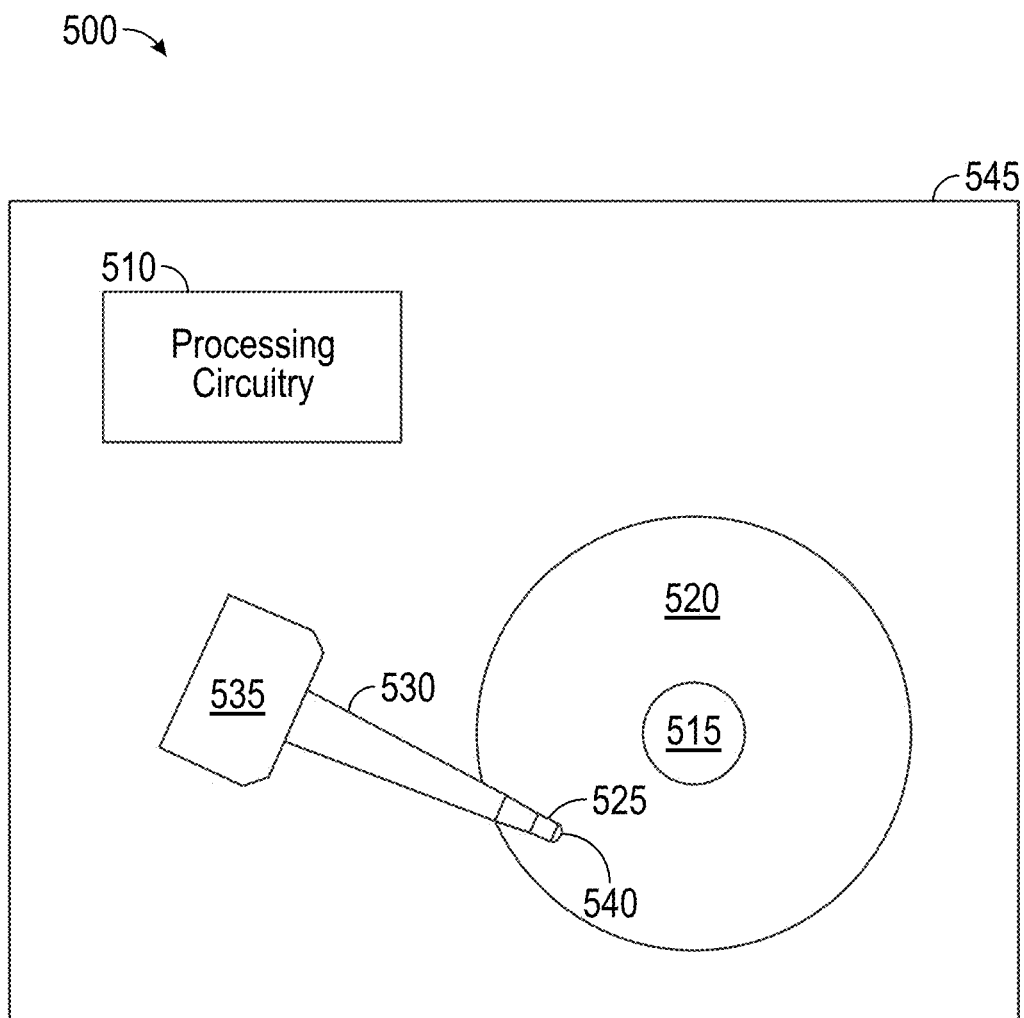
FIG. 1 illustrates a hard disk drive that may embody one or more embodiments disclosed herein.

FIG. 1 illustrates several components of a hard disk drive 500. The magnetic hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, includes a combined read and write magnetic head 540. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520.

In operation, the actuator 535 moves the suspension and actuator arm 530 to position the slider 525 so that the magnetic head 540 is in a transducing relationship with the surface of the magnetic disk 520. The head 540 may be used to write information to one or more tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks.

For writing, the head 540 may use a single pole writer (i.e., a write transducer) that has a main pole surrounded by magnetic shield materials. The main pole is typically separated from the magnetic shield materials by a non-magnetic spacer. The main pole may have a tapered shape with a tip that faces the magnetic recording media and is part of the ABS. The single pole writer may include a conductive coil encircling the writer pole in a helical or pancake-like configuration.

To write to the disk 520, the slider 525 passes over a region of the disk 520, and an electric current is applied through the coil of the head 540, which causes a large magnetic field to be generated from the main pole tip. The polarity of the generated field causes a region of the magnetic disk 520 to assume a polarity, thus enabling information to be stored on the disk 520.

To read information from the disk 520, the head 540 may include only one read sensor, or it may include multiple read sensors. The read sensor(s) in the head 540 may include, for example, one or more giant magnetoresistance (GMR) sensors, tunneling magnetoresistance (TMR) sensors, or another type of magnetoresistive sensor. When the slider 525 passes over a region of the disk 520, the head 540 detects changes in resistance due to magnetic field variations recorded on the disk 520, which represent the recorded bits.

Traditionally, the size of the bits has been reduced in order to increase the amount of data that can be stored on the disk 520. Correspondingly, the size of the write transducer has decreased roughly in proportion to the size of the bits. But to obtain high recording density, a write field of sufficient magnitude must be focused on a small area of the disk, which is increasingly difficult as the size of the write transducer decreases. Consequently, techniques such as microwave-assisted magnetic recording (MAMR) and heat-assisted magnetic recording (HAMR) have been developed to improve writing technology. In MAMR, elements added to the head 540 generate an additional field that supplements the magnetic field ordinarily produced by the write transducer, thereby providing a stronger effective write field. In HAMR, elements added to the head 540 heat a localized area on the surface of the recording media (e.g., the disk 520) to reduce its coercivity, thereby enabling the magnetic field generated by the write transducer, which otherwise would be of insufficient strength, to set the magnetization of the localized area. Although these more advanced techniques can provide improved storage density, there is a limit to how small the storage locations can be, and the head 540 needs to fly close to the surface of the disk 520 to provide sufficiently strong magnetic fields.

The inventors had the insight that adding an assistive mechanism to the storage media instead of, or in addition to, the head 540 would offer several advantages relative to prior-art recording techniques. First, if used in a media with a single recording layer, an assistive mechanism could allow the head 540 to fly further from the surface of the media because an assist would be provided from within the media, in closer proximity to the storage location being written to or read from. Second, if used in a media with two or more recording layers, an assistive mechanism could enable the media to record more data, thereby increasing its overall storage capacity. Third, an assistive mechanism within the media could be used to enable remote reading of the data on a storage media, thereby eliminating the need for a head 540 to fly over the media to read data. Such a system may be particularly attractive for archived data.

These and other advantages are enabled in the systems and methods disclosed herein. Some embodiments of data storage systems include embedded disconnected circuits (EDC) within a data storage media to improve the performance of the data storage system (e.g., one or more of its data storage capacity, its durability, its data access speed, etc.) or to relax the requirements on elements of the data storage system (e.g., the distance between the write transducer and the media during write and/or read operations, the slider's fly height, the density of storage locations one or more recording layers of the media, etc.). As discussed herein, the EDC may be used in a number of ways to assist recording data to the media and/or reading data from the media.

In some embodiments, the EDC assist a write transducer to write data to a recording layer of a media. The write transducer may be a conventional write transducer (e.g., it may or may not include components in addition to the write pole, coil, and return pole, such as those used in HAMR, MAMR, etc.). The recording layer assisted by the EDC may be the only recording layer on the media, or it may be an additional (e.g., second, third, etc.) recording layer added to the media. In some embodiments, the media includes at two recording layers, and the EDC enable the use of at least one of the two recording layers.

In some embodiments, the EDC assist in reading data from a recording layer. In some embodiments, the EDC include a read sensor that is positioned near (e.g., over, under, adjacent to, etc.) one or more storage locations to read the contents of the one or more storage locations and to send a wireless signal providing the contents of the storage location(s) to a signal processing component of the data storage device. For example, the read sensor may comprise a resistive element, the resistance of which changes in response to the magnetization of the storage location(s). In some embodiments, the EDC are capable of reading one or more nearby storage locations and transmitting a wireless signal providing information (e.g., about the contents, identity, and/or location of the storage location(s); about the identity and/or location of the EDC; etc.) to a receiver embedded in a slider that flies over the media. In some embodiments, reading is coordinated by reader circuitry that is located remotely from the media (i.e., the reader circuitry is not included in a slider that flies over the media), and the EDC are capable of receiving wireless read commands and transmitting wireless read responses.

Media with EDC

Figure 2A:
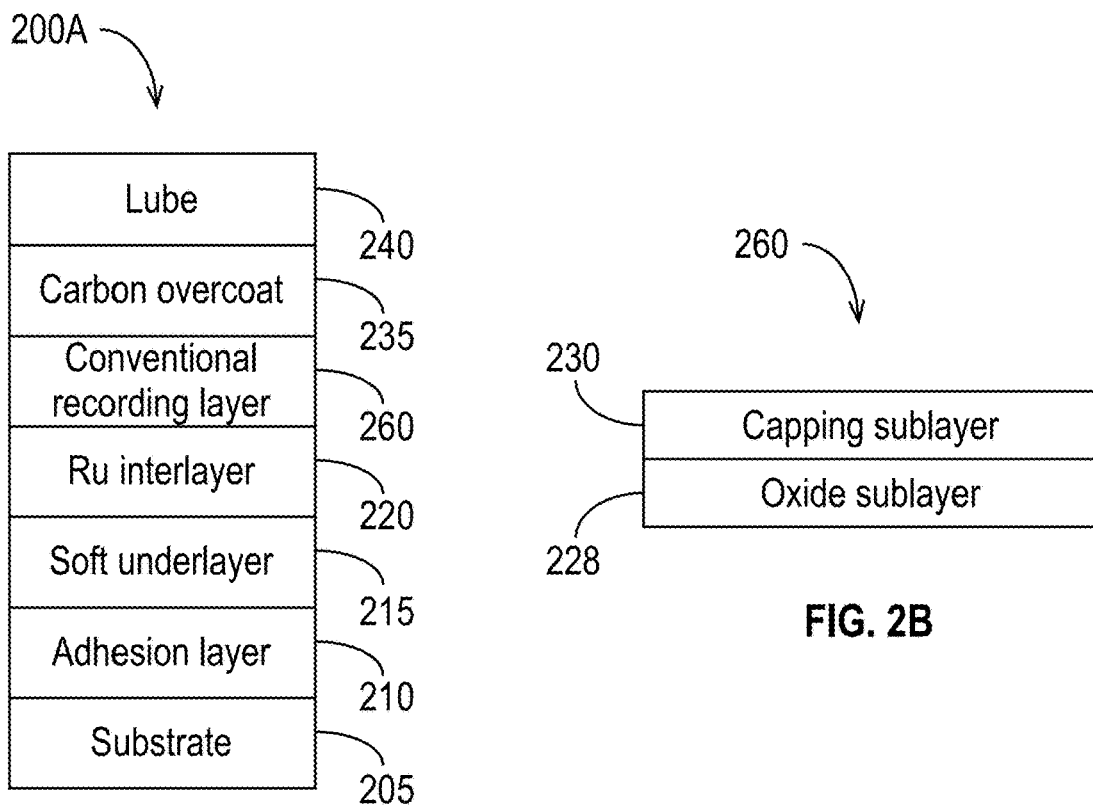
FIG. 2A illustrates a cross-sectional view of an exemplary layered media stack.

FIG. 2A illustrates a cross-sectional view of an exemplary layered media stack 200A that may be included in a conventional hard disk 520 using perpendicular magnetic recording (PMR) with a single depth of bits stored in a single recording layer 260 located near the surface of the media. The media includes a bottom substrate 205 (e.g., an aluminum platter), an adhesion layer 210 (e.g., NiP plating, an AlTi layer, etc.), a soft underlayer (SUL) 215 (e.g., a soft alloy containing cobalt, nickel, iron, tantalum, and/or zirconium), a ruthenium (Ru) interlayer 220, a recording layer 260, a carbon overcoat layer 235 (e.g., a carbon bilayer, the bottom layer being CHx and the top layer being CNx), and a lubricant layer 240.

The recording layer 260 may include, for example, thin films with a plurality of magnetic grains, each grain having a magnetic easy axis substantially perpendicular to the media surface, thereby allowing the grains to be vertically magnetized. The magnetic grains may comprise a magnetic material such as, for example, CoPt, CoPtCr, CoPtCrB, etc. To maintain a highly segregated magnetic layer, one or more segregants may be added to the magnetic material.

Figure 2B:
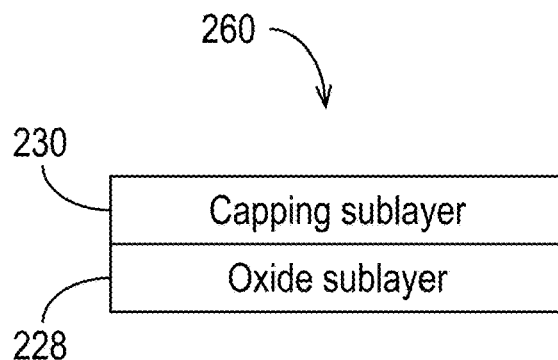
FIGS. 2B and 2C illustrate two possible arrangements of a recording layer of a magnetic recording media in accordance with some embodiments.
Figure 2C:
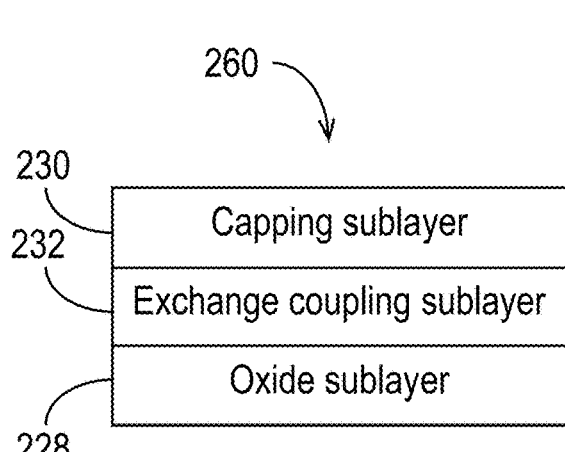

The recording layer 260 may be configured in any suitable arrangement. FIGS. 2B and 2C illustrate two possible arrangements of the recording layer 260. FIG. 2B shows a recording layer 260 with two sublayers: an oxide sublayer 228, which includes an oxide, and a capping sublayer 230, which does not include an oxide. The oxide sublayer 228 may comprise, for example, a CoPtCr alloy with one or more segregants including various oxides such as SiOx, TaOx, TiOx, and/or CrOx, and/or various elements such as B and Ti.

FIG. 2C shows a recording layer 260 with an exchange coupling sublayer 232 inserted between the oxide sublayer 228 and the capping sublayer 230. The exchange coupling sublayer 232 may be formed of materials such as, for example, Co alloys including Ru, Cr, Pt and/or B. The exchange coupling sublayer 232 provides for a reduction of interfacial exchange coupling strength between the oxide sublayer 228 and the capping sublayer 230. In addition to or instead of the exchange coupling sublayer 232, various other layers can be introduced between the oxide sublayer 228 and the capping sublayer 230 to improve the performance of the recording layer 260.

The media stack 200A illustrated in FIG. 2A and the recording layers 260 illustrated in FIGS. 2B and 2C are merely examples of the layers that may be included in a media stack. Variants may include media with different numbers of layers and different materials than shown in FIGS. 2A-2C. For example, U.S. Pat. No. 7,998,607 to Ikeda, which is hereby incorporated by reference in its entirety for all purposes, discloses a partially-oxidized capping layer that may be used in accordance with some embodiments. U.S. Pat. No. 8,202,636 to Choe et al., which is also hereby incorporated by reference in its entirety for all purposes, discloses media for perpendicular magnetic recording that control anisotropy levels in different sublayers of the magnetic recording layer(s) 260 of the media.

Figure 2D:
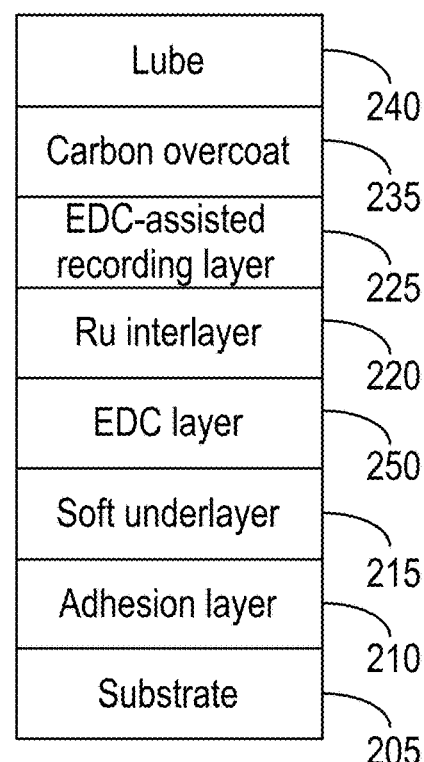
FIG. 2D illustrates a cross-sectional view of an exemplary media stack that includes an EDC layer in accordance with some embodiments.

FIGS. 2D-2F illustrate how the exemplary media stack 200A of FIG. 2A may be modified to include the EDC disclosed herein. Again, the materials and layers illustrated are merely examples, and a media stack may include additional or fewer layers having different characteristics. It is to be understood that the principles disclosed herein are applicable to other media having different numbers or orders of layers, or using different materials.

FIG. 2D illustrates a cross-sectional view of an exemplary media stack 200B in accordance with some embodiments. The media stack 200B includes many of the layers discussed above in the context of FIG. 2A. Instead of the conventional recording layer 260, the media stack 200B includes an EDC-assisted recording layer 225, which is assisted by an EDC layer 250 added to the media stack 200B. The EDC-assisted recording layer 225 may be indistinguishable from a conventional recording layer 260 but is referred to as the EDC-assisted recording layer 225 because the EDC layer 250 assists in the reading from and/or writing to the EDC-assisted recording layer 225. In general, the discussion above of the conventional recording layer 260 (e.g., regarding materials, layers, properties, etc.) applies with equal force to the EDC-assisted recording layer 225. One key difference between a conventional recording layer 260 and an EDC-assisted recording layer 225, as those terms are used herein, is that reading from and/or writing to the EDC-assisted recording layer 225 is potentially assisted by EDC, whereas reading from and/or writing to the conventional recording layer 260 is accomplished without the assistance of EDC.

In the media stack 200B, the EDC layer 250 is embedded between the SUL 215 and the Ru interlayer 220. FIG. 2E illustrates an exemplary EDC layer 250 in accordance with some embodiments. As shown in FIG. 2E, the EDC layer 250 may comprise a set of at least one EDC 150, which may be sandwiched by structural support layers 255A, 255B. The structural components of the EDC 150 are discussed below. In general, the structural support layers 255A, 255B provide topological support for the EDC 150 and for other layers that may be used in magnetic recording (e.g., the exemplary layers 210, 215, 220, etc.). If present, the structural support layers 255A, 255B above and below the EDC layer 250 may be different, depending on the requirements for fabricating the layers adjacent to the structural support layers 255A, 255B. Armed with the disclosures herein, skilled artisans will understand how to select the characteristics (e.g., material, thickness, etc.) of and fabricate the structural support layers 255A, 255B.

FIG. 2F illustrates a cross-sectional view of another exemplary layered media stack 200C in accordance with some embodiments. In the media stack 200C, an EDC layer 250 is embedded in the media between two adhesion layers 210A, 210B, which reside between the SUL 215 and the substrate 205, and the EDC-assisted recording layer 225 resides between the carbon overcoat layer 235 and the Ru interlayer 220. As in FIG. 2D, the EDC layer 250 may comprise the EDC 150 sandwiched by structural support layers 255A, 255B. In other words, the EDC 150, which may be sandwiched by structural support layers 255A, 255B, are sandwiched between the two adhesion layers 210A, 210B in the embodiment of FIG. 2F.

FIG. 2G illustrates a cross-sectional view of another exemplary layered media stack 200D in accordance with some embodiments. In the media stack 200D, an EDC layer 250 is embedded in the media between the adhesion layer 210 and the Ru interlayer 220, and the EDC-assisted recording layer 225 is disposed between the Ru interlayer 220 and the carbon overcoat layer 235. As in FIGS. 2D and 2F, the EDC layer 250 may comprise the EDC 150 sandwiched between structural support layers 255A, 255B as shown in FIG. 2E. In the example of FIG. 2G, the EDC layer 250 replaces the SUL 215 and, as a result, may also be imbued with some or all of the characteristics of the SUL 215.

In some embodiments, the EDC 150 are added to assist writing to and/or reading from a media that includes only one EDC-assisted recording layer 225 instead of a conventional recording layer. In some embodiments, the EDC 150 are added to convert the media from a two-dimensional storage media having only a single recording layer (whether conventional or EDC-assisted) to a three-dimensional storage media by providing the ability to store data in EDC-assisted recording layers 225 that are under the single recording layer (i.e., whether a conventional recording layer 260 or an EDC-assisted recording layer 225).

FIGS. 3A-3C and 5A-5B are simplified illustrations of magnetic storage systems in accordance with some embodiments. For ease of description, FIGS. 3A-3C and 5A-5B show only the head 540, the recording layer(s) 260, 225, the EDC layer(s) 250, and, if present, an optional isolation layer 170 of the media stack. As explained above, the media stack generally includes additional layers that are not illustrated in FIGS. 3A-3C and 5A-5B.

Figure 3A:
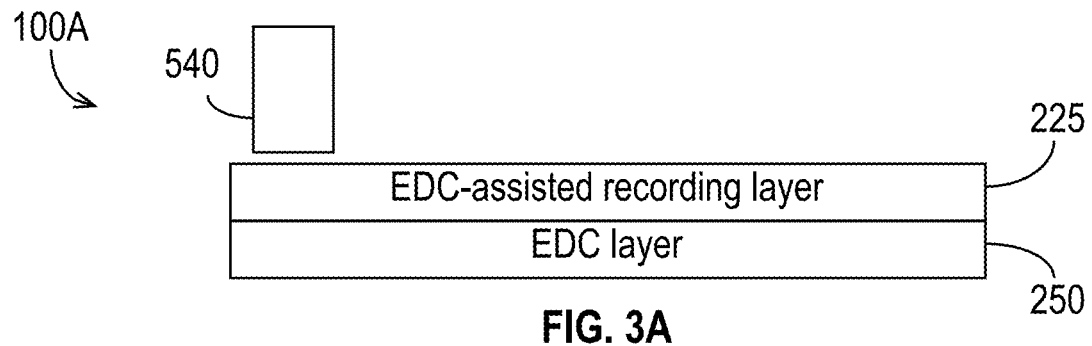
FIGS. 3A-3C are simplified illustrations of exemplary magnetic storage systems in accordance with some embodiments.

FIG. 3A illustrates an exemplary magnetic storage system 100A with a media stack that includes an EDC-assisted recording layer 225 and an EDC layer 250 in accordance with some embodiments. As explained below, the EDC 150 in the EDC layer 250 may assist the head 540 to write data to and/or read data from the recording layer 225. In the example illustrated in FIG. 3A, the EDC-assisted recording layer 225 replaces a conventional recording layer 260 and may result in a media stack that looks similar or identical to the media stack 200B, 200C, or 200D of FIGS. 2D, 2F, and 2G, respectively.

Figure 3B:
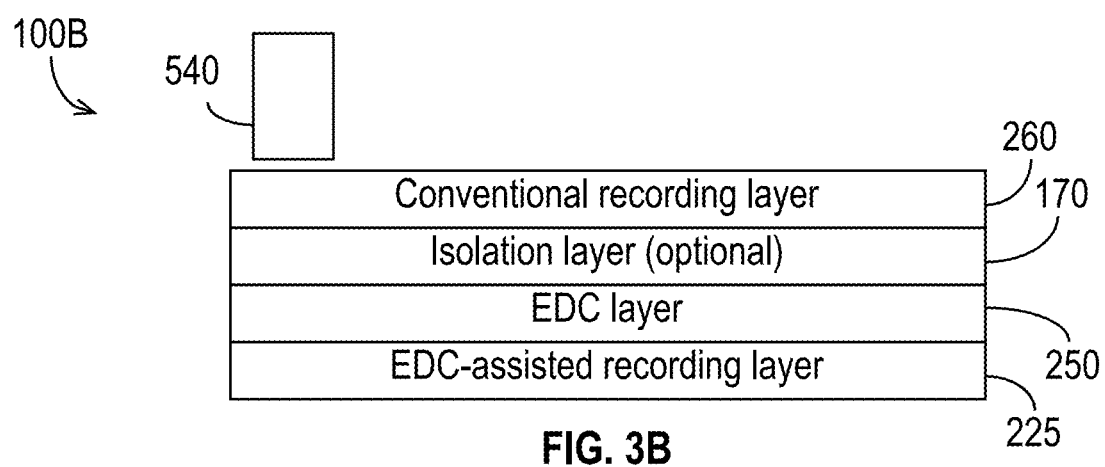

FIG. 3B illustrates the use of EDC 150 in an example magnetic recording system 100B to enable the use of an EDC-assisted recording layer 225 in addition to a conventional recording layer 260 in accordance with some embodiments. In the example shown in FIG. 3B, an EDC layer 250 resides between the conventional recording layer 260 and the EDC-assisted recording layer 225. The conventional recording layer 260 is used in the conventional way, i.e., it is written to and read from by the head 540 without assistance from the EDC 150 in the EDC layer 250. An optional isolation layer 170, which may provide structural, electromagnetic, and/or thermal isolation, may be disposed between the conventional recording layer 260 and the EDC layer 250 to mitigate interactions between the EDC 150 and the conventional recording layer 260, or to prevent the EDC 150 from interacting with or affecting the conventional recording layer 260. Armed with the disclosures herein, skilled artisans will understand how to select suitable materials for and characteristics of the isolation layer 170.

Figure 4A:
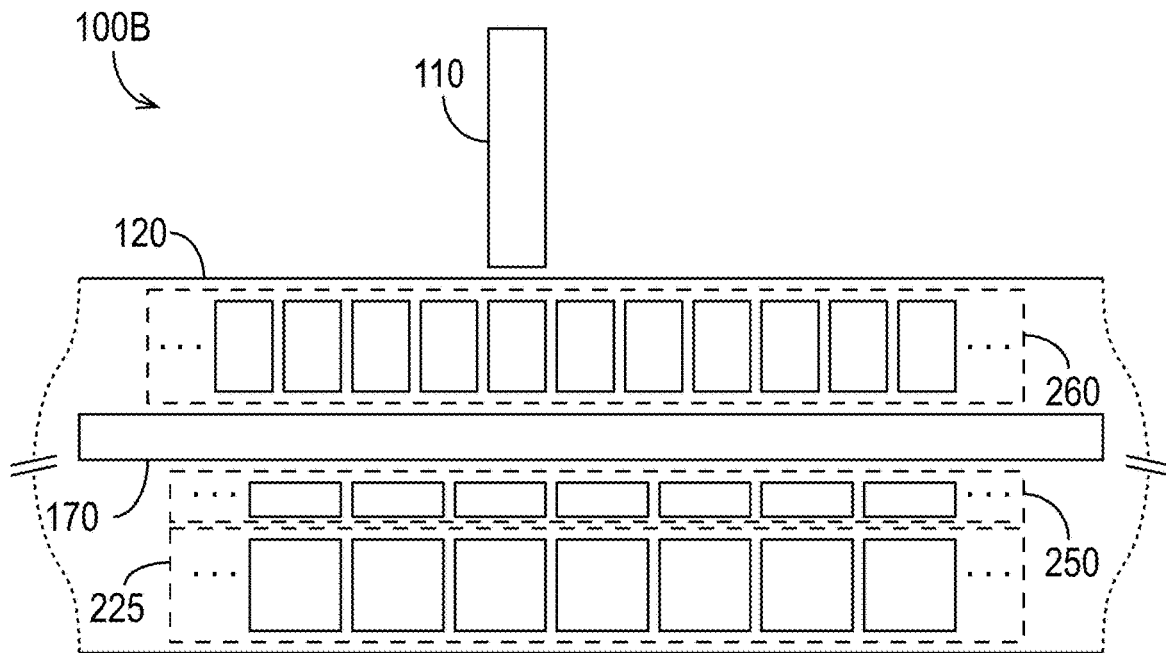
FIGS. 4A-4D illustrate certain elements of exemplary magnetic recording systems in accordance with some embodiments.
Figure 4B:
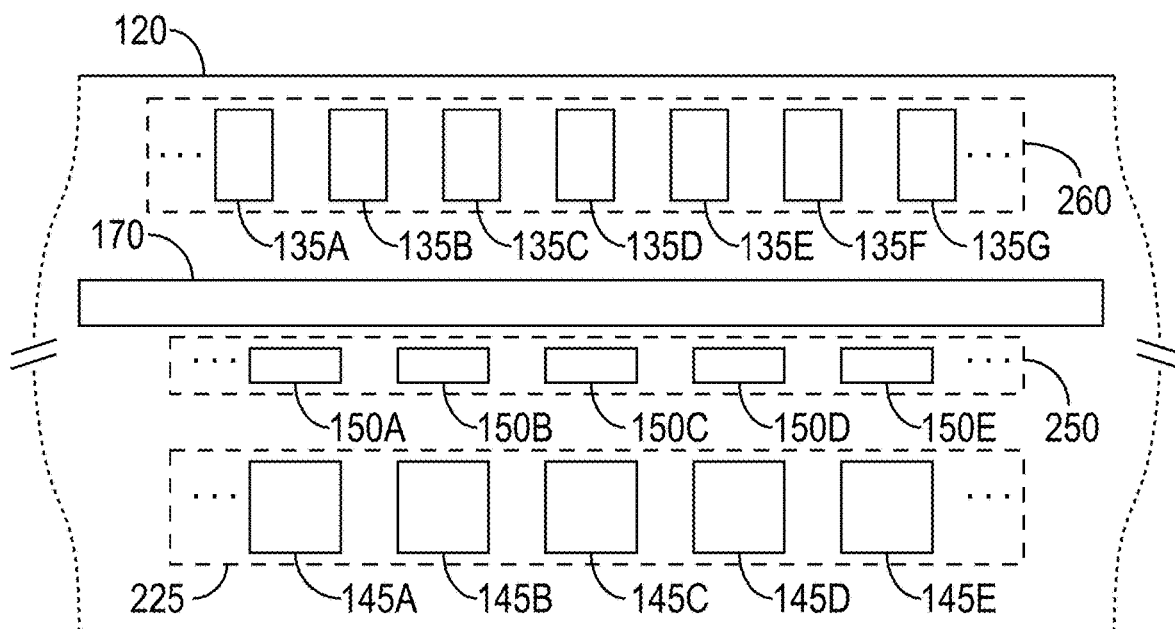

FIGS. 4A and 4B illustrate certain elements of the magnetic recording system 100B in more detail. FIG. 4A shows a write transducer 110 and a portion of the media 120. As shown in FIG. 4A, a magnetic storage media 120 comprises a conventional recording layer 260 near the surface of the media 120 that faces the write transducer 110, and an EDC-assisted recording layer 225 located deeper in the media 120, further away from the write transducer 110. An EDC layer 250 is disposed above and adjacent to the EDC-assisted recording layer 225. It is to be understood that the EDC layer 250 need not be adjacent to the EDC-assisted recording layer 225, but close proximity may be desirable to maximize the impact of the EDC 150 on the EDC-assisted recording layer 225. In the example illustrated in FIG. 4A, the isolation layer 170 is shown between the EDC layer 250 and the conventional recording layer 260. As discussed above, the isolation layer 170 may mitigate or prevent interaction between the EDC 150 and the conventional recording layer 260.

FIG. 4B is a closer view of a portion of the magnetic storage media 120 of FIG. 4A. As shown, the conventional recording layer 260 includes a plurality of storage locations 135A, 135B, 135C, etc. The EDC-assisted recording layer 225 includes a plurality of EDC-assisted storage locations 145A, 145B, 145C, etc., and the EDC layer 250 includes a plurality of EDC 150A, 150B, 150C, etc. (To avoid obscuring the drawing, FIG. 4B does not illustrate any structural support layers 255 that might be present in the EDC layer 250.) A storage location 135, 145 can be any defined portion of the media that stores data. For example, the storage locations 135 and/or 145 may be within a track or sector. As another example, the storage locations 135 and/or 145 may be in the form of bit-patterned media. Bit patterned media are described in U.S. Pat. No. 7,324,294 to Moser and U.S. Pat. No. 6,947,235 to Albrecht et al., both of which are hereby incorporated by reference in their entireties.

The EDC-assisted storage locations 145 in the EDC-assisted recording layer 225 may be written to and/or read from by selectively activating one or more associated EDC 150 in the EDC layer 250 to write to and/or read from selected ones of the EDC-assisted storage locations 145. As illustrated in FIGS. 4A and 4B, the number and dimensions of the storage locations 135 need not be the same as the number and dimensions of the EDC-assisted storage locations 145. For example, it may be desirable to use different or optimized sizes and/or shapes (e.g., geometrics, dimensions, configurations, etc.) for the storage locations 145 in the EDC-assisted recording layer 225 than in the conventional recording layer 260 to maximize the effectiveness of the EDC 150. Furthermore, although FIG. 4B illustrates the EDC-assisted storage locations 145 and the EDC 150 in a one-to-one ratio, a single EDC 150 may be used during read and/or write operations involving multiple EDC-assisted storage locations 145. For example, the EDC 150 may enable bank reading or bank writing whereby multiple EDC-assisted storage locations 145 are read from or written to simultaneously. Similarly, multiple EDC 150 may be used during read and/or write operations involving a single EDC-assisted storage location 145. For example, a first EDC 150 may assist in the writing process, and a second EDC 150 may assist in the reading process.

Figure 3C:
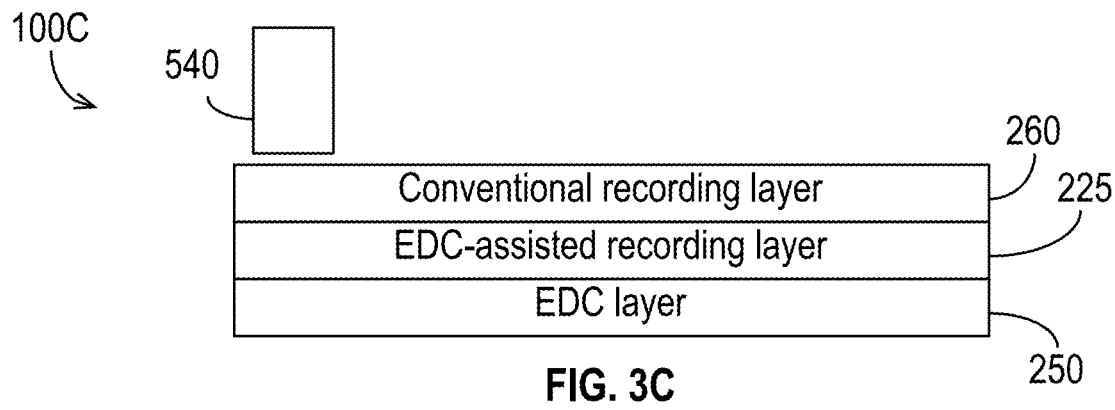

FIG. 3C illustrates another exemplary magnetic recording system 100C that enables the use of an EDC-assisted recording layer 225 in addition to a conventional recording layer 260 in accordance with some embodiments. In the example system 100C, the EDC layer 250 resides below the EDC-assisted recording layer 225. This positioning of the EDC layer 250 may reduce or eliminate any need for an optional isolation layer 170 between the first and second recording layers 225A, 225B. Although not illustrated in FIG. 3C, the example system 100C may also include an isolation layer 170, which may be disposed, for example, between the first and second recording layers 225A, 225B.

Figure 4C:
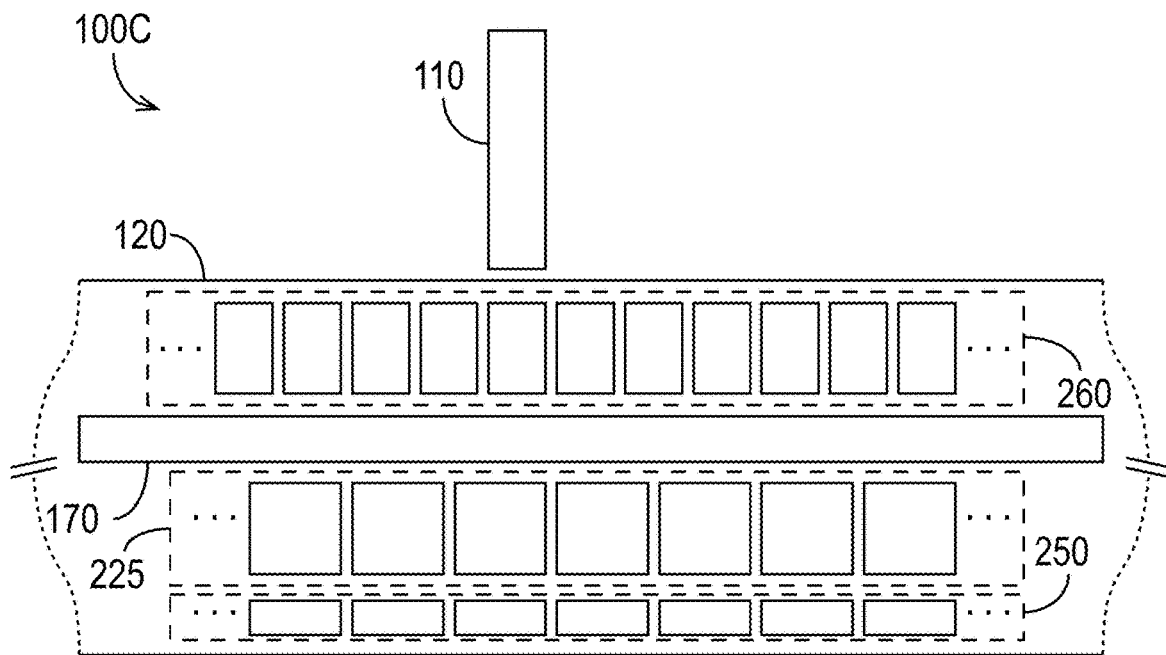
Figure 4D:
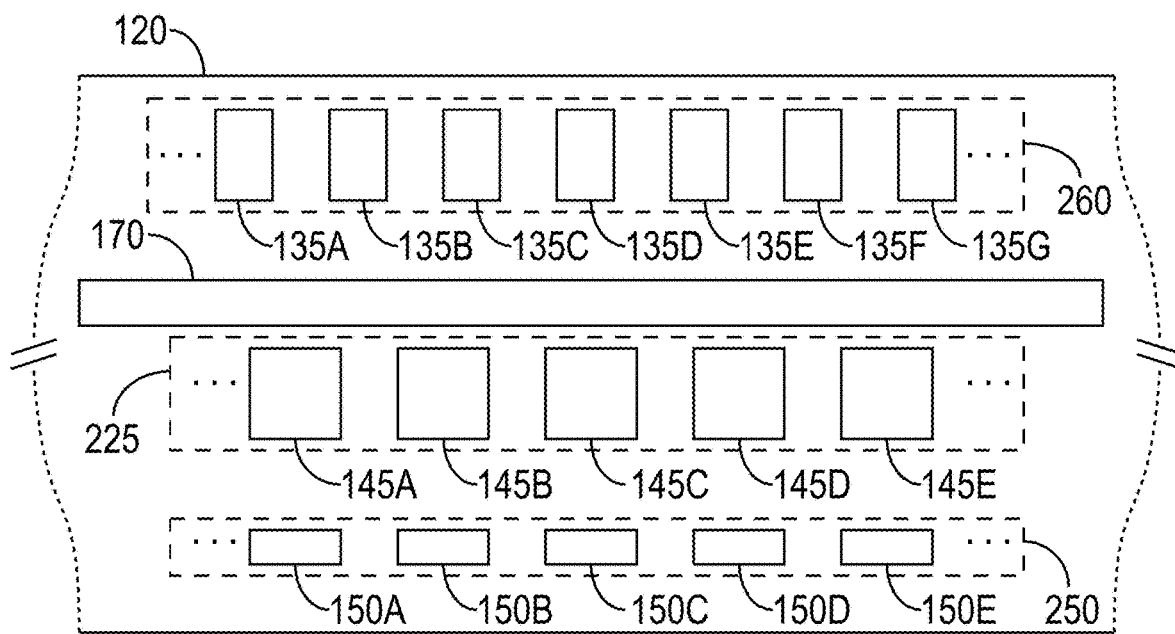

FIGS. 4C and 4D illustrate certain elements of the magnetic recording system 100C shown in FIG. 3C in more detail. As shown in FIG. 4C, a magnetic storage media 120 comprises a conventional recording layer 260 near the surface of the media 120, and an EDC-assisted recording layer 225 located deeper in the media 120. An EDC layer 250 is disposed below and adjacent to the EDC-assisted recording layer 225. It is to be understood that the EDC layer 250 need not be adjacent to the EDC-assisted recording layer 225, but close proximity may be desirable to maximize the ability of the EDC 150 to assist the EDC-assisted recording layer 225. Unlike in FIG. 3C, in the example illustrated in FIG. 4C, an optional isolation layer 170 is provided between the EDC-assisted recording layer 225 and the conventional recording layer 260.

FIG. 4D is a closer view of a portion of the magnetic storage media 120 of FIG. 4C. As shown, the conventional recording layer 260 includes a plurality of storage locations 135A, 135B, 135C, etc. The EDC-assisted recording layer 225 includes a plurality of EDC-assisted storage locations 145A, 145B, 145C, etc., and the EDC layer 250 includes a plurality of EDC 150A, 150B, 150C, etc. (and may also include structural support layers 255 as discussed above). As illustrated in FIGS. 4C and 4D, and as discussed above in the context of FIGS. 4A and 4B, the number and dimensions of the EDC-assisted storage locations 145 need not be the same as the number and dimensions of the conventional storage locations 135. Furthermore, a single EDC 150 may be used during read and/or write operations involving multiple EDC-assisted storage locations 145. Similarly, multiple EDC 150 may be used during read and/or write operations involving a single EDC-assisted storage location 145. For example, a first EDC 150 may assist in the writing process, and a second EDC 150 may assist in the reading process.

Figure 5A:
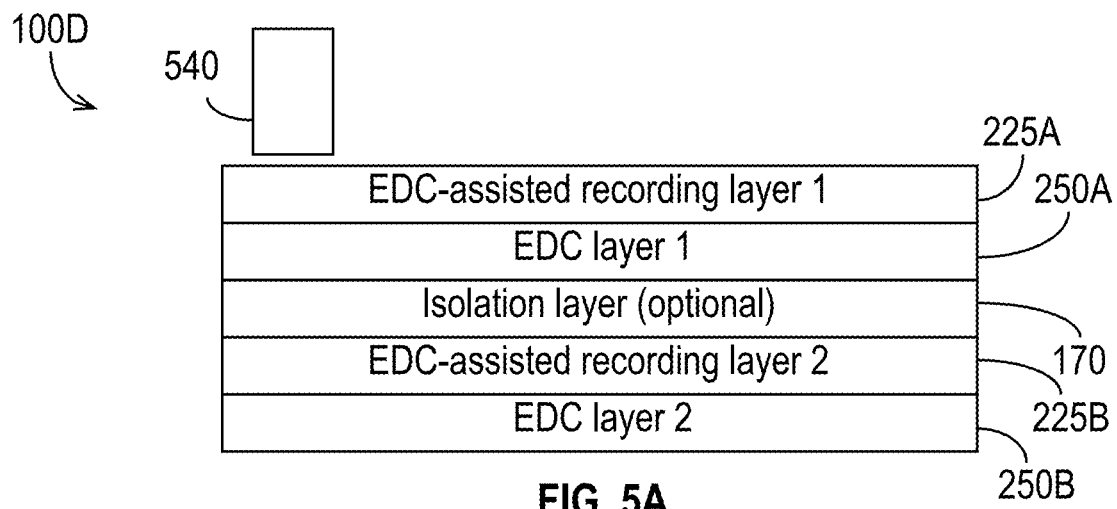
FIGS. 5A-5B are simplified illustrations of exemplary magnetic storage systems in accordance with some embodiments.

FIG. 5A illustrates another exemplary magnetic recording system 100D that enables the use of multiple EDC-assisted recording layers 225 in accordance with some embodiments. The example system 100D includes two EDC layers 250. The first EDC layer 250A assists the head 540 to write to the first EDC-assisted recording layer 225A, and the second EDC layer 250B assists the head 540 to write to the second EDC-assisted recording layer 225B. Thus, the recording process for each of the first and second EDC-assisted recording layers 225A, 225B takes advantage of EDC 150. Similarly, the reading process may also take advantage of the EDC 150 in the EDC layers 250A, 250B. An optional isolation layer 170 (e.g., as described above in the context of FIG. 3B) may be disposed between the first EDC layer 250A and the second EDC-assisted recording layer 225B to mitigate or prevent interactions between the EDC 150 in the first EDC layer 250A and the storage locations 145 in the second EDC-assisted recording layer 225B.

Figure 6A:
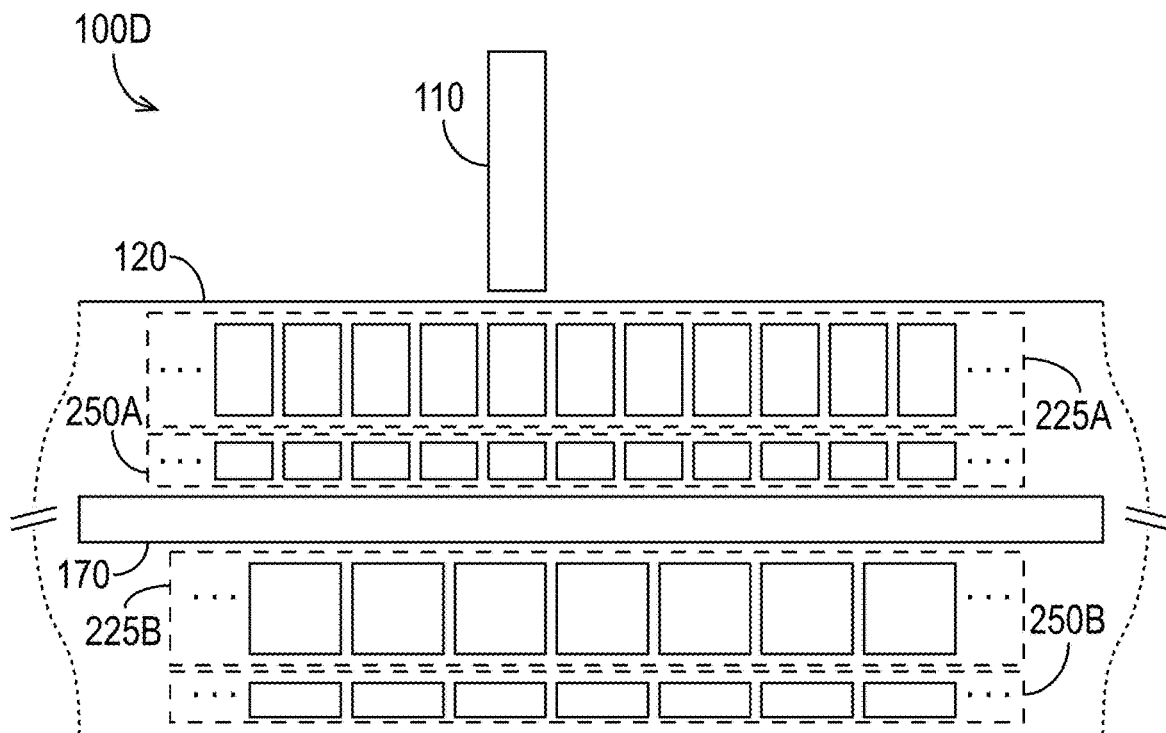
FIGS. 6A-6D illustrate certain elements of exemplary magnetic recording systems in accordance with some embodiments.
Figure 6B:
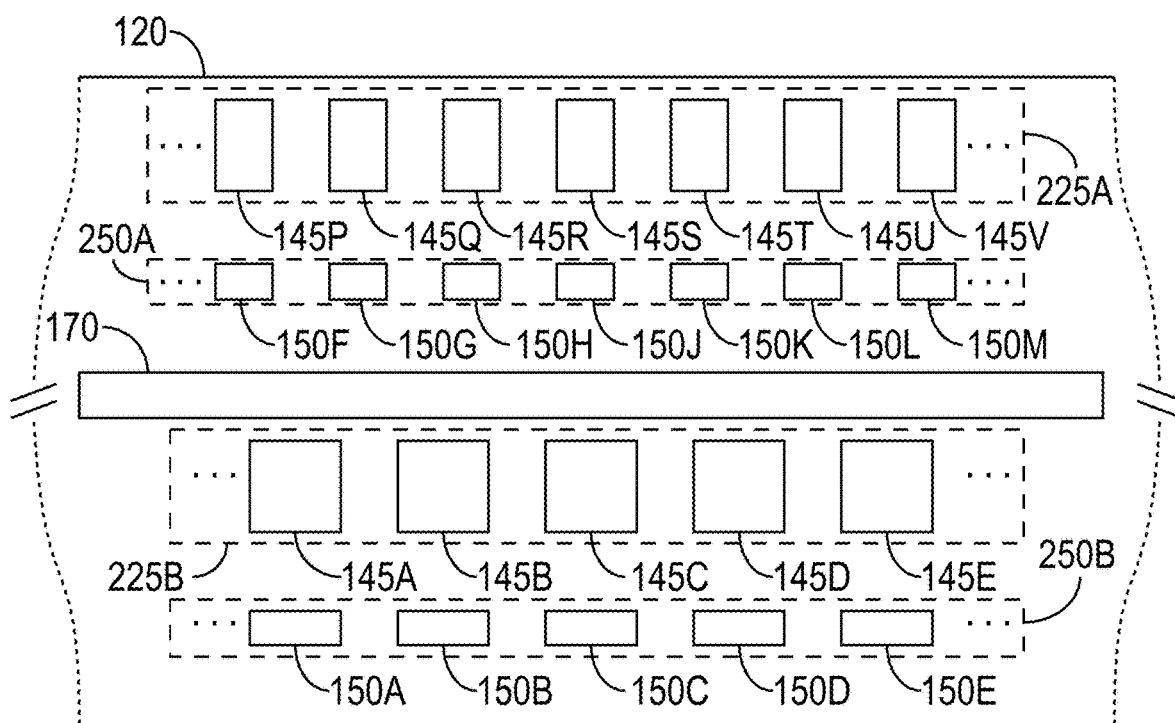

FIGS. 6A and 6B illustrate certain elements of the magnetic recording system 100D in more detail. As shown in FIG. 6A, a magnetic storage media 120 comprises a first EDC-assisted recording layer 225A near the surface of the media 120, and a second EDC-assisted recording layer 225B located deeper in the media 120. A first EDC layer 250A is disposed below and adjacent to the first EDC-assisted recording layer 225A, and a second EDC layer 250B is disposed below and adjacent to the second EDC-assisted recording layer 225B. It is to be understood that the first and second EDC layers 250A, 250B need not be adjacent to their respective EDC-assisted recording layers 225, but close proximity may be desirable to maximize the impact of the EDC 150 on the EDC-assisted recording layers 225. In the example illustrated in FIG. 6A, an isolation layer 170 is provided between the second EDC-assisted recording layer 225B and the first EDC layer 250A.

FIG. 6B is a closer view of a portion of the magnetic storage media 120 of FIG. 6A. As shown, the first EDC-assisted recording layer 225A includes a plurality of EDC-assisted storage locations 145P, 145Q, 145R, etc., and the second EDC-assisted recording layer 225B includes a plurality of EDC-assisted storage locations 145A, 145B, 145C, etc. The first EDC layer 250A includes a plurality of EDC 150F, 150G, 150H, etc., and the second EDC layer 250B includes a plurality of EDC 150A, 150B, 150C, etc. One or both of the first and second EDC layers 250A, 250B may also include structural support layers 255 as discussed above. As illustrated in FIGS. 6A and 6B, the number and dimensions of the EDC-assisted storage locations 145 in the first EDC-assisted recording layer 225A need not be the same as the number and dimensions of the EDC-assisted storage locations 145 in the second EDC-assisted recording layer 225B. Furthermore, a single EDC 150 in the first EDC layer 250A maybe used during read and/or write operations involving multiple EDC-assisted storage locations 145 in the first EDC-assisted recording layer 225A, and a single EDC 150 in the second EDC layer 250B may be used during read and/or write operations involving multiple EDC-assisted storage locations 145 in the second EDC-assisted recording layer 225B. Similarly, multiple EDC 150 in either EDC layer 250A, 250B may be used during read and/or write operations involving a single EDC-assisted storage location 145. For example, a first EDC 150 may assist in the writing process, and a second EDC 150 may assist in the reading process.

Figure 5B:
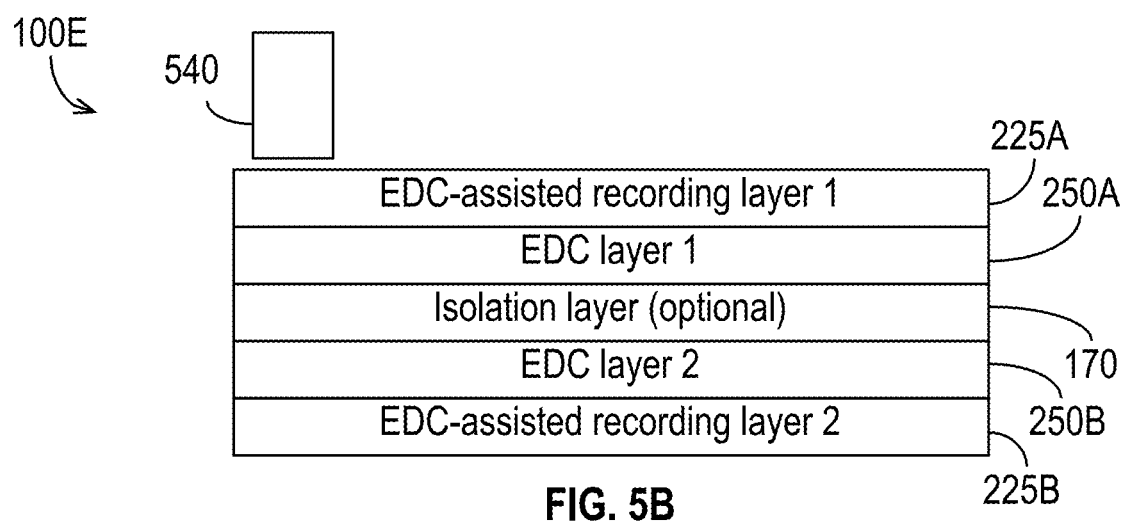

FIG. 5B illustrates another exemplary magnetic recording system 100E that enables the use of multiple EDC-assisted recording layers 225 in accordance with some embodiments. Like the exemplary system 100D of FIG. 5A, the example system 100E includes two EDC layers 250. The first EDC layer 250A assists the head 540 to write to the first EDC-assisted recording layer 225A, and the second EDC layer 250B assists the head 540 to write to the second EDC-assisted recording layer 225B. Thus the recording process for each of the first and second EDC-assisted recording layers 225A, 225B takes advantage of EDC 150. In the system 100E, the first and second EDC-assisted recording layers 225A, 225B are separated by the first and second EDC layers 250A, 250B. An optional isolation layer 170 (e.g., as described above in the context of FIG. 3B) may be disposed between the first and second EDC layers 250A and 250B to mitigate or prevent interactions between the EDC 150 in the first EDC layer 250A and the second EDC-assisted recording layer 225B, and to mitigate or prevent interactions between the EDC 150 in the second EDC layer 250B and the first EDC-assisted recording layer 225A.

Figure 6C:
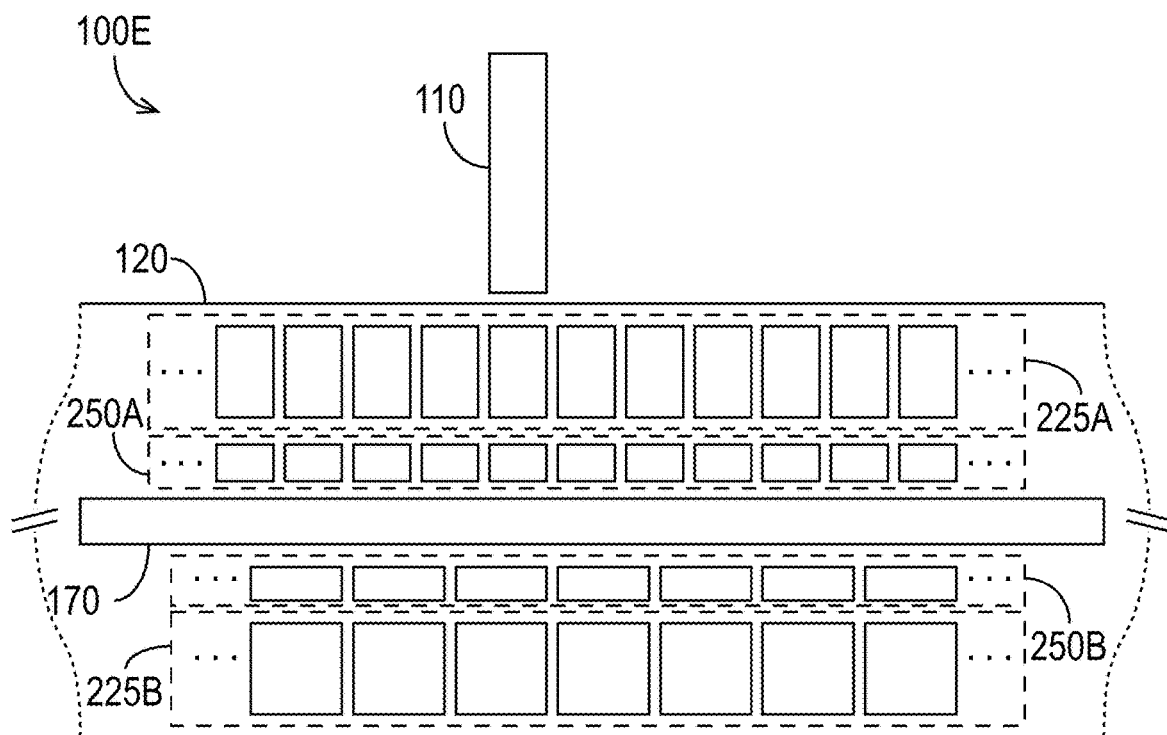
Figure 6D:
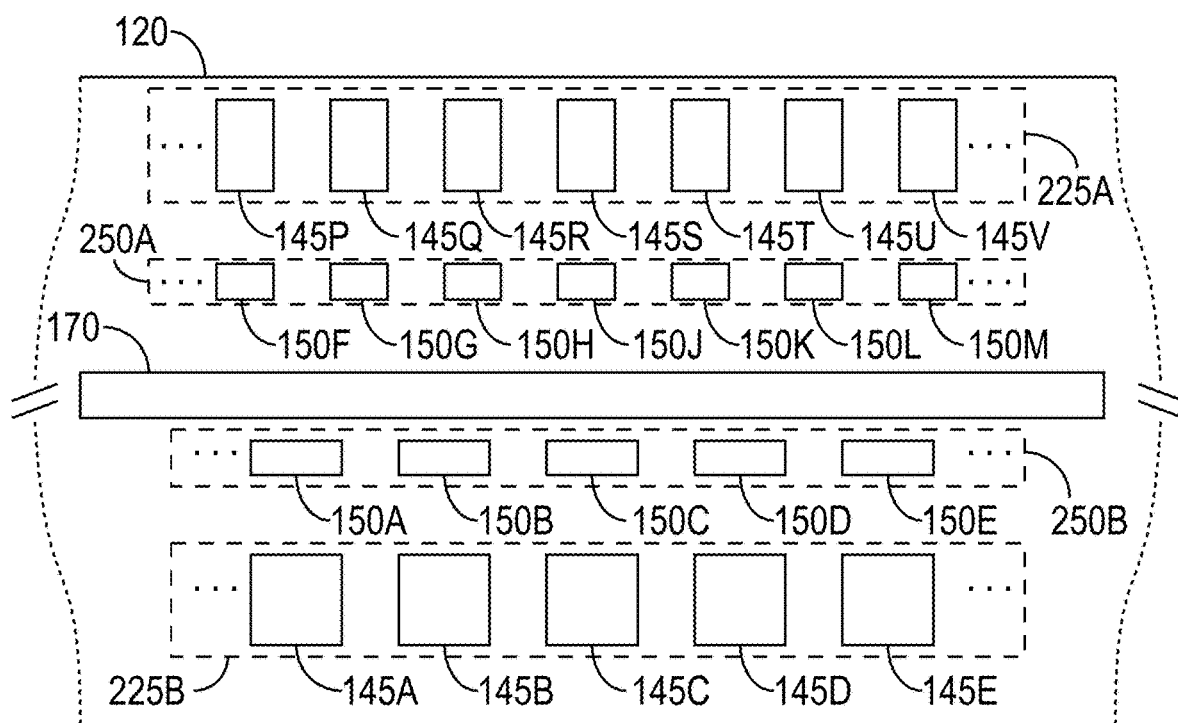

FIGS. 6C and 6D illustrate certain elements of the magnetic recording system 100E in more detail. As shown in FIG. 6C, a magnetic storage media 120 comprises a first EDC-assisted recording layer 225A near the surface of the media 120, and a second EDC-assisted recording layer 225B located deeper in the media 120. A first EDC layer 250A is disposed below and adjacent to the first EDC-assisted recording layer 225A, and a second EDC layer 250B is disposed above and adjacent to the second EDC-assisted recording layer 225B. It is to be understood that the first and second EDC layers 250A, 250B need not be adjacent to their respective EDC-assisted recording layers 225, but close proximity may be desirable to maximize the impact of the EDC 150 in an EDC layer 250 on the target EDC-assisted recording layer 225. In the example illustrated in FIG. 6C, an isolation layer 170 is provided between the first and second EDC layers 250A and 250B.

FIG. 6D is a closer view of a portion of the magnetic storage media 120 of FIG. 6C. As shown, the first EDC-assisted recording layer 225A includes a plurality of EDC-assisted storage locations 145P, 145Q, 145R, etc., and the second EDC-assisted recording layer 225B includes a plurality of EDC-assisted storage locations 145A, 145B, 145C, etc. The first EDC layer 250A includes a plurality of EDC 150F, 150G, 150H, etc., and the second EDC layer 250B includes a plurality of EDC 150A, 150B, 150C, etc. One or both of the first and second EDC layers 250A, 250B may also include structural support layers 255 as discussed above. As illustrated in FIGS. 6C and 6D, and as discussed above in the context of FIGS. 4A and 4B, the number and dimensions of the EDC-assisted storage locations 145P, 145Q, 145R, etc. in the first EDC-assisted recording layer 225A need not be the same as the number and dimensions of the EDC-assisted storage locations 145A, 145B, 145C, etc. in the second EDC-assisted recording layer 225B. Furthermore, a single EDC 150 in the first EDC layer 250A maybe used during read and/or write operations involving multiple storage locations 145 in the first EDC-assisted recording layer 225A, and a single EDC 150 in the second EDC layer 250B may be used during read and/or write operations involving multiple EDC-assisted storage locations 145 in the second EDC-assisted recording layer 225B.

It is to be understood that in general, a recording media can include any number of recording layers 260, 225, conventional and/or EDC-assisted, and EDC layers 250. The presence of EDC-assisted recording layers 225 in addition to conventional recording layers 260 may provide an opportunity to relax some of the requirements on the conventional recording layer(s) 260 and/or the head 540. For example, if a media includes both a conventional recording layer 260 and an EDC-assisted recording layer 225, the total number of storage locations, some of which are EDC-assisted and others of which are not, may exceed the total number available in a conventional media. Therefore, it is possible to relax some of the requirements on the conventional recording layer 260 and/or other characteristics of the data storage device 100 (e.g., slider fly height, density of storage locations, etc.) without sacrificing the overall data storage capacity of the data storage device 100. Moreover, the total number of storage locations 135, 145 in a media that includes one or more EDC layers 250 may substantially exceed the number that would be available in a media with only a conventional recording layer 260, even if the storage density within a conventional recording layer 260 is reduced.

Moreover, the number of EDC layers 250 included in a recording media need not be the same as the number of additional recording layers. A single EDC layer 150 may be capable of assisting reading and/or writing of multiple EDC-assisted recording layers 225. For example, an EDC layer 250 may be sandwiched between two EDC-assisted recording layers 225 and capable of assisting to read from and/or write to both EDC-assisted recording layers 225. The EDC 150 in such an EDC layer 250 may be capable of selectively reading from/writing to each of the EDC-assisted recording layers 225.

Furthermore, as explained above, EDC 150 may be added to a media that includes only a single recording layer to assist in writing to and/or reading from that recording layer, thereby converting a conventional recording layer 260 to an EDC-assisted recording layer 225.

The EDC

The exemplary media illustrated in FIGS. 2D, 2F, 2G, and 3A-6D can store data in the EDC-assisted recording layers 225 by setting the magnetizations of the EDC-assisted storage locations 145. As described below, the EDC 150 embedded in the EDC layer(s) 250 of the media provide assistance during the writing process, the reading process, or both.

FIG. 7A illustrates an EDC 150 in accordance with some embodiments. The EDC 150 includes an antenna 152 and circuitry 155. The EDC 150 may be a frequency-selective circuit. For example, the antenna 152 may comprise a frequency-selective antenna in which the oscillating electric and magnetic fields of an incoming radio wave create oscillating currents in the antenna 152 only if the incoming radio wave is of a particular frequency or within a particular frequency range. Alternatively or in addition, the antenna 152 may include a frequency-selective surface (FSS) (e.g., an optical filter, a metal-mesh optical filter, or any surface having a pattern designed to reflect, transmit, or absorb electromagnetic fields based on the frequency of the field). The antenna 152 may be omnidirectional (i.e., capable of receiving energy approximately equally from all directions) or directional (i.e., more sensitive to energy received from a particular direction). If directional, the antenna 152 may be configured (e.g., in design, in placement, in orientation, etc.) to maximize its coupling to electromagnetic energy in a particular direction. The antenna 152 may be of any suitable type (e.g., a monopole antenna, a dipole antenna, etc.). Furthermore, the antenna 152 may be an array of antennas (e.g., a phased array, a log-periodic dipole array, etc.).

Different EDC 150 may have antennas 152 with differing characteristics. For example, in some embodiments, frequency diversity enables the selective activation of the EDC 150. In such embodiments, the antenna 152 of a first EDC 150 may be configured to create oscillating currents only when a signal having a first frequency is received, and the antenna 152 of a second EDC 150 may be configured to create oscillating currents only when a signal having a second frequency is received so that the first EDC 150 may be activated independently of the second EDC 150, and vice versa.

The circuitry 155 of the EDC 150 may include circuitry for reading from the media and/or circuitry for writing to the media. In general, the circuitry 155 of the EDC 150 may comprise any circuit element (e.g., active, passive, analog, digital, etc.). Examples of circuit elements that may be included in the circuitry 155 include resistors, capacitors, inductors, transistors, operational amplifiers, diodes, gates, transformers, switches, etc. In operation, the EDC 150 is energized by a time-varying electromagnetic radio-frequency (RF) signal transmitted by a circuit of the data storage device (e.g., a circuit that is separate from the EDC 150 and its circuitry 155). The RF signal generates an AC voltage across the antenna 152, which supplies power to the circuitry 155. The AC voltage may optionally be rectified. As described below, the energized EDC 150 can then (a) assist the head 540 to write to a recording layer 225 and/or (b) read or assist in reading data previously-stored in a recording layer 225.

The EDC 150 may be distributed or embedded within the EDC layer 250 in any suitable pattern and at any suitable density. As just one example, one EDC 150 may be included in the media for every 200 bits in a Tb/in$^2$ surface, assuming the area of the antenna 152 is 1 μm$^2$.

FIG. 7B illustrates an exemplary EDC 150 in which the circuitry 155 comprises a resistive element 156 in accordance with some embodiments. In operation, the power supplied by the antenna 152 to the resistive element 156 causes the resistive element 156 to generate heat. As a result, because the EDC layer 250 is adjacent to or near the recording layer 225, the portion of the recording layer 225 near the resistive element 156 is heated, which lowers its coercivity and allows the write transducer 110 of the head 540 to record data to the heated storage location(s) in that localized region of the media.

FIG. 7C illustrates an exemplary EDC 150 in which the circuitry 155 comprises a resonator 157 in accordance with some embodiments. In operation, the power supplied by the antenna 152 to the resonator 157 causes the resonator 157 to emit electromagnetic waves that add constructively to the write field generated by the write transducer 110, thereby providing a sufficient field to switch nearby storage locations in the recording layer 225.

FIG. 7D illustrates an exemplary EDC 150 in which the circuitry 155 comprises a heat generator 158. Similarly to the resistive element 156 described above, the heat generator 158 causes the portion of the recording layer 225 near it to heat, which lowers its coercivity and allows the write transducer 110 to more easily record data to the heated storage location(s) near the heat generator 158.

FIG. 7E illustrates an exemplary EDC 150 in which the circuitry 155 comprises an active circuit 160. In operation, the power supplied by the antenna 152 to the active circuit 160 causes the active circuit 160 to provide an assist to the write transducer 110. For example, the active circuit 160 may generate a microwave field that augments the write field. As another example, the active circuit 160 may generate electromagnetic energy that heats the recording layer near the active circuit 160 to lower its coercivity and allow the magnetization of one or more storage locations to be adjusted more easily.

FIG. 7F illustrates an exemplary EDC 150 in which the circuitry 155 comprises a spin-torque oscillator (STO) 162, or a similar spin-torque nanodevice. In operation, the power supplied by the antenna 152 to the STO 162 causes the magnetization of the STO 162 to oscillate and generate a microwave field that augments the field of the write transducer 110, thereby enabling writing to the storage location(s) assisted by that EDC 150.

FIG. 7G illustrates an exemplary EDC 150 in which the circuitry 155 comprises a read sensor 164. The read sensor 164 may be configured to vary in response to a magnetization of one or more storage location(s) assisted by the EDC 150. In some embodiments, the read sensor 164 is a conventional magnetoresistive (MR) sensor (i.e., a "spin-valve" sensor based on the giant magnetoresistance (GMR) effect). A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the sensing or free layer. With a sense current applied to the sensor, the rotation of the free-layer magnetization relative to the reference-layer magnetization due to the presence of an external magnetic field is detectable as a change in electrical resistance.

In some embodiments, the read sensor 164 is a magnetic tunnel junction sensor, also called a tunneling MR or TMR sensor, in which the nonmagnetic spacer layer is a very thin nonmagnetic insulating tunnel barrier layer such as $TiO_2$, MgO or $Al_2O_3$. The barrier layer is sufficiently thin that quantum-mechanical tunneling of charge carriers occurs between the two ferromagnetic layers. This quantum-mechanical tunneling process is electron spin dependent, which means that an electrical resistance measured when applying a sense current across the junction depends on the spin-dependent electronic properties of the ferromagnetic and barrier layers, and is a function of the relative orientation of the magnetizations of the two ferromagnetic layers.

As will be appreciated by skilled artisans, there are myriad possible elements and combinations of elements that may be included in the circuitry 155, and the examples provided herein are not intended to be limiting. Moreover, an EDC 150 may include more than one of the elements described in the context of FIGS. 7A-7G. For example, an EDC 150 may comprise an element (e.g., 156, 157, 158, 160, 162, etc.) to assist in writing to the EDC-assisted recording layer 225 and a separate element (e.g., 164, etc.) to assist in reading from the EDC-assisted recording layer 225.

Using EDC to Write to a Deeper Recording Layer Using a Conventional Head

For ease of terminology, many of the exemplary embodiments discussed below are typically discussed as if the media includes only one EDC-assisted recording layer 225, but it is to be appreciated that, as explained previously, the techniques disclosed herein can be used advantageously to provide additional EDC-assisted recording layers 225. For example, if the surface of the platter is in the x-y plane, the disclosures herein may be used to provide for multiple EDC-assisted recording layers 225 in the z-direction.

In some embodiments, because the EDC-assisted recording layer 225 lies underneath the conventional recording layer 260, the objective is to write data to the EDC-assisted recording layer 225 while preserving information recorded in other layers (e.g., in the conventional recording layer 260 and in any additional EDC-assisted recording layers 225 previously written to). In other words, the goal is to write to the conventional recording layer 260 and the EDC-assisted recording layer(s) 225 independently.

In some embodiments, the exchange break layers of the media are tuned so that, absent the assistance of the EDC 150, the EDC-assisted recording layer 225 is more difficult to write than the conventional recording layer 260. In such embodiments, when the EDC 150 are not energized, the magnetic field generated by the write transducer 110 is insufficient to overcome the coercivity of the EDC-assisted storage locations 145 in the EDC-assisted recording layer 225, and none of the cells in the EDC-assisted recording layer 225 are written to. When an EDC 150 is energized, it generates a field that augments the writer's magnetic field (or otherwise provides an assist, such as, e.g., by heating the EDC-assisted recording layer 225) and allows one or more storage locations 145 in the EDC-assisted recording layer 225 to be written to.

In embodiments in which the media includes one conventional recording layer 260 and an EDC-assisted recording layer 225, the coercivities of the layers can be different to provide more control over recording in the EDC-assisted recording layer 225. For example, referring again to FIG. 3C, the EDC-assisted recording layer 225 can have a higher coercivity than the conventional recording layer 260 so that when the EDC 150 in the EDC layer 250 are inactive, the magnetic field generated by the write transducer 110 is strong enough to switch the magnetization in the conventional recording layer 260, but it is insufficient to switch the magnetization of the EDC-assisted recording layer 225. In contrast, when the EDC 150 in the EDC layer 250 are energized, the magnetic field generated by the write transducer 110, with the assistance provided by the EDC 150 (e.g., in the form of heat or a field that adds constructively to or otherwise augments the field generated by the write transducer 110, as described above) is sufficient to switch the magnetization of the EDC-assisted recording layer 225.

In some embodiments, the conventional recording layer 260 can be written to without affecting the EDC-assisted recording layer 225, but writing to the EDC-assisted recording layer 225 affects the conventional recording layer 260. For example, the coercivity of the conventional recording layer 260 may be lower than the coercivity of the EDC-assisted recording layer 225. In some such embodiments, the write process comprises two steps: a first step in which at least one EDC 150 in the EDC layer 250 is activated, and both the conventional recording layer 260 and the EDC-assisted recording layer 225 are written to, and a second step in which all EDC 150 are inactive and only the conventional recording layer 260 is written to.

In some embodiments in which a two-step recording procedure is used, the EDC 150 are used in conjunction with a recording process in the first step to enable the EDC-assisted recording layer 225 to be written. Because the coercivity of the conventional recording layer 260 is lower than that of the EDC-assisted recording layer 225, the EDC-assisted recording process may also cause one or more storage locations 135 in the conventional recording layer 260 to be written to. For example, the field emitted by the write transducer 110 may change the magnetization of an EDC-assisted storage location 145 in the EDC-assisted recording layer 225, which is desired, and it may also change the magnetization of one or more conventional storage locations 135 in the conventional recording layer 260, which is not desired. In general, the storage locations 135 in the conventional recording layer 260 that are most likely to be overwritten when the EDC-assisted storage locations 145 are written to are those closest to the EDC-assisted storage locations 145, because those storage locations 135 are most likely to be affected by the write transducer 110's magnetic field. In the second step, the EDC 150 are not activated, and the magnetic field strength may be reduced to a level that is insufficient to overcome the coercivity of the EDC-assisted recording layer 225. The storage locations 135 in the conventional recording layer 260 may then be written to without affecting the data previously stored in the EDC-assisted recording layer 225 in the first step.

A similar approach allows the preservation of data previously stored in the conventional recording layer 260 when the EDC-assisted recording layer 225 is written. In some embodiments, prior to beginning the process to write to the EDC-assisted recording layer 225, the contents of the storage location(s) 135 of the conventional recording layer 260 that may be affected by the process of writing to the EDC-assisted recording layer 225 (e.g., the storage locations 135 that are closest to the EDC-assisted storage locations 145 to be written to) are noted. Then the EDC(s) 150 are activated, and selected EDC-assisted storage locations 145 in the EDC-assisted recording layer 225 are written to. As explained above, this process may modify the contents of certain storage locations(s) 135 of the conventional recording layer 260 (e.g., those that are closest to the EDC-assisted storage locations 145 being written to). The EDC(s) 150 are then deactivated, and the affected storage location(s) 135 of the conventional recording layer 260 are re-written to restore the contents of the storage location(s) 135.

It is also possible to write to the EDC-assisted recording layer 225 without affecting the contents of storage locations 135 in the conventional recording layer 260. For example, resonators may be used to enable independent selection of the EDC-assisted recording layer 225 for writing without affecting the conventional recording layer 260.

Figure 8A:
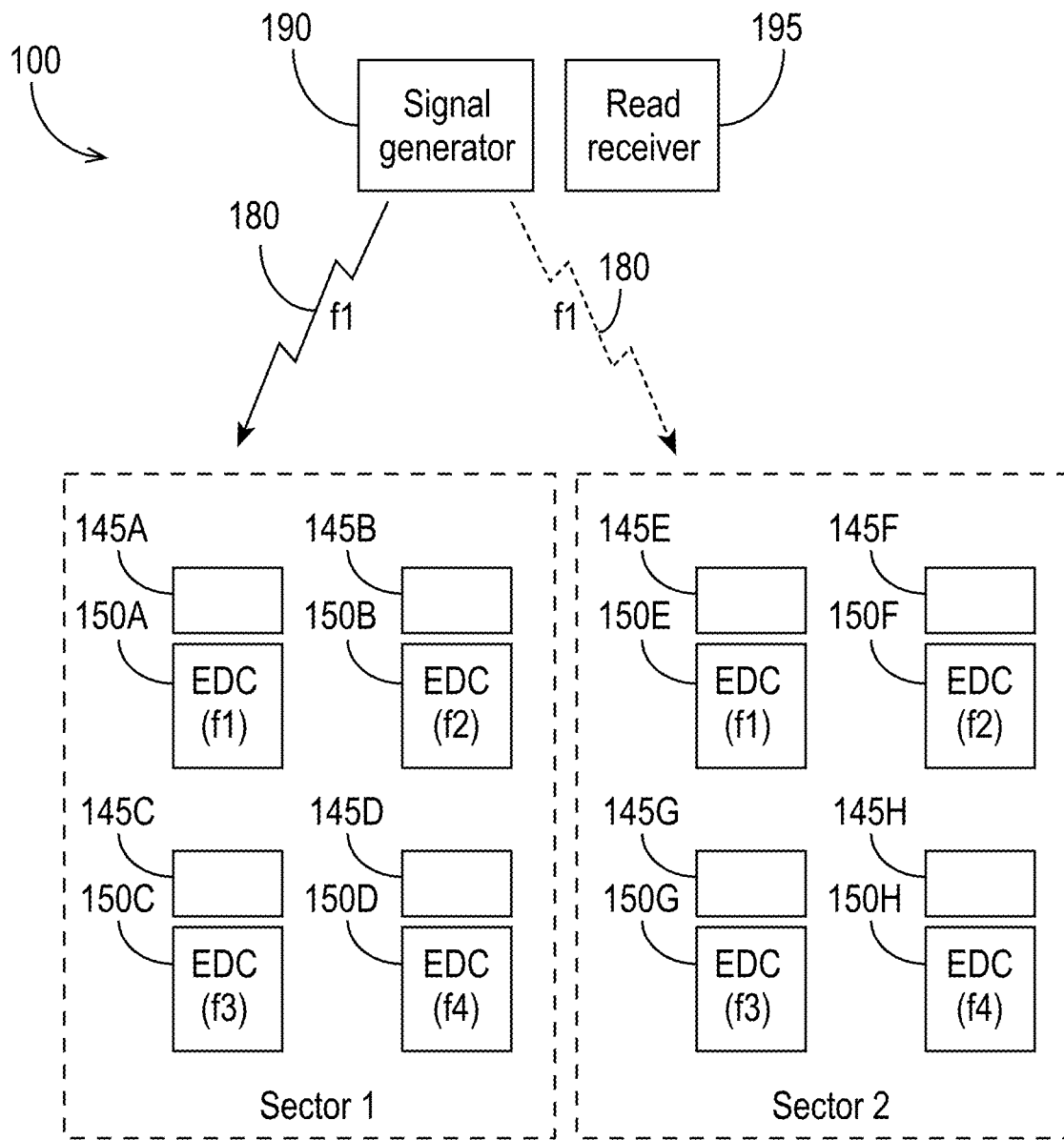
FIGS. 8A and 8B illustrate a magnetic storage system in accordance with some embodiments.

In order for the EDC 150 to assist in writing to an EDC-assisted recording layer 225, the EDC 150 must be activated. FIG. 8A is a conceptual illustration of a magnetic storage system 100 in accordance with some embodiments. As shown in FIG. 8A, the media has been partitioned into sectors. Sectors 1 and 2 are shown. Each sector includes a plurality of EDC 150 and EDC-assisted storage locations 145. FIG. 8A illustrates one EDC 150 per EDC-assisted storage location 145, but, as explained above, the EDC 150 and EDC-assisted storage locations 145 need not be in a one-to-one relationship. For ease of explanation, each sector shown in FIG. 8A is illustrated having only four EDC 150 and four EDC-assisted storage locations 145. Sector 1 includes EDC 150A, 150B, 150C, and 150D and corresponding EDC-assisted storage locations 145A, 145B, 145C, and 145D. Sector 2 includes EDC 150E, 150F, 150G, and 150H and corresponding EDC-assisted storage locations 145E, 145F, 145G, and 145H. The EDC 150A and 150E are configured to be activated by an activation signal 180 having a frequency of f1. The EDC 150B and 150F are configured to be activated by an activation signal 180 having a frequency of f2. The EDC 150C and 150G are configured to be activated by an activation signal 180 having a frequency of f3, and the EDC 150D and 150H are configured to be activated by an activation signal 180 having a frequency of f4.

As shown in FIG. 8A, the magnetic storage system 100 comprises a signal generator 190 wirelessly coupled to (i.e., configured to transmit wireless signals to and/or receive wireless signals from) the EDC 150. The signal generator 190 includes circuitry to generate wireless signals and a transmitter capable of transmitting wireless signals. It is to be understood that the transmitter of the signal generator 190 may be positioned in or on the slider 525, or it may be in another location within the data storage device 100 (e.g., in a fixed position not in the immediate vicinity of the storage location 135, 145 of the media to be written to/read from).

In embodiments in which the transmitter of the signal generator 190 is positioned in or on the slider 525, the signal generator 190 may be in close proximity to the EDC 150 to be activated and may be able to direct an activation signal toward only the EDC 150 to be activated. In such cases, there may be little risk of unintended activation of other EDC 150.

In embodiments in which the signal generator 190 transmits activation signals from further away (e.g., when the signal generator 190 is in a location away from the head 540 and/or media), there may be a risk that the activation signal activates EDC 150 in addition to the intended one(s). To mitigate the unintended activation of EDC 150 other than the one(s) intended, the signal generator 190 may comprise a directional antenna enabling the signal generator 190 to launch the activation signal 180 in a particular direction (e.g., toward a target EDC 150). In the example shown in FIG. 8A, the signal generator 190 is targeting the EDC 150A in Sector 1 and launches the activation signal 180, having the frequency f1, in the direction of EDC 150A. As illustrated, the activation signal 180 may also travel in other directions, such as toward Sector 2 (which may be, e.g., an adjacent sector, a sector in an EDC layer 250 other than the one targeted, etc.). Thus, the EDC 150E, which is also configured to respond to activation signals 180 having the frequency f1, may also be activated by the activation signal 180.

In operation, to activate a specific EDC 150, the signal generator 190 generates an activation signal 180 and transmits it to that EDC 150 (and, as described above, potentially to other EDC 150), potentially using a directional antenna. The signal generator 190 may be capable of generating activation signals 180 having different characteristics (e.g., frequencies, etc.), as explained further below. To provide selectivity in EDC 150 activation, different EDC antennas 152 may be configured to respond to different RF frequencies so that an activation signal 180 of a selected frequency activates a particular EDC 150 (or set of more than one EDC 150). Moreover, the EDC antennas 152 may be directional antennas so that, for example, a selected EDC 150 is activated by a first activation signal 180 having a frequency of f1 received from a first direction but not a second signal having a frequency of f1 received from a second direction (e.g., 90 degrees away). Thus, one or more characteristics of the RF activation signals 180 (e.g., frequency, timing, phase, direction, etc.) that activate the various EDC 150 may be used to address or target particular EDC 150 and the memory cells within range of those EDC 150.

In some embodiments, such as shown in FIG. 8A, the EDC 150 are in sectors, and only one EDC 150 in each sector responds to an activation signal 180 having a particular set of characteristics. In such embodiments, the activation signal 180 may activate more than one EDC 150 (for example, the activation signal 180 shown in FIG. 8A may activate both EDC 150A in Sector 1 and EDC 150E in Sector 2), but each activated EDC 150 is in a different sector. For write operations using a write transducer 110 as described above, the write transducer 110 is over only the portion of the media to be written, which corresponds to the EDC-assisted storage location(s) 145 associated with the activated EDC 150, and therefore the activation of one or more EDC 150 outside of that sector does not cause writing to unintended EDC-assisted storage locations 145 away from the write transducer 110. As a concrete example, referring to FIG. 8A, the write transducer 110 would be over the EDC-assisted storage location 145A, so even if the activation signal 180 were to activate EDC 150E, only the EDC-assisted storage location 145A would be written to. The EDC-assisted storage location 145E would not be affected because the write transducer 110 would not generate a field strong enough to switch the magnetization of the EDC-assisted storage location 145E.

In the example shown in FIG. 8A, the activation signal 180 has a characteristic, namely its frequency, selected to activate a particular EDC 150 (or set of EDC 150) in the media. It is to be appreciated that other aspects of the activation signal 180 may be used instead of or in addition to the frequency to activate selected EDC 150. Examples of other characteristics include amplitude, modulation, duty cycle, bandwidth, or any other controllable characteristic of a transmitted signal.

There are many benefits of using EDC 150 to write to a storage media. For example, higher-capacity storage is feasible because of the ability to store data in three dimensions of the media instead of only two. Furthermore, the use of EDC 150 eases requirements on the write head and media because the EDC 150 provide an assist to the write transducer 110. As a consequence, the write head can be larger, and the same magnitude magnetic field can be used to write to storage locations 145 in the EDC-assisted recording layer 225 because the EDC 150 supply an assisting field or other assistive function (e.g., heat to reduce coercivity). Moreover, the media does not need to be as smooth as it needs to be without the use of EDC 150 because the head 540 can fly higher above the media and still provide the same or better performance as in a conventional storage device. Also, the storage device 100 does not need to provide power to the EDC 150 corresponding to storage locations 145 that are not being written to. Another advantage is that the EDC 150 can enable bulk or bank writes. The writer may turn on an array of EDC 150 in the media and target an RF signal toward that location (or those locations), thereby writing to an area of the media.

Reading from a Data Storage Media Using EDC

In some embodiments, EDC 150 embedded in a media are used to read data stored in an EDC-assisted recording layer 225. For example, as explained above, the circuitry 155 of an EDC 150 may include read circuitry (e.g., a read sensor 164) that is activated by an activation signal 180 received by the EDC 150 antenna 152. The read circuitry enables an EDC 150 to interrogate a nearby EDC-assisted storage location 145 (or a nearby set of EDC-assisted storage locations 145). The EDC 150 may also include transmitting circuitry that enables the EDC 150 to wirelessly transmit a signal reporting the result of the interrogation to a receiver in the storage system. The receiver may be located on or in a slider 525 that flies over the media, or it may be located away from the media.

Figure 8B:
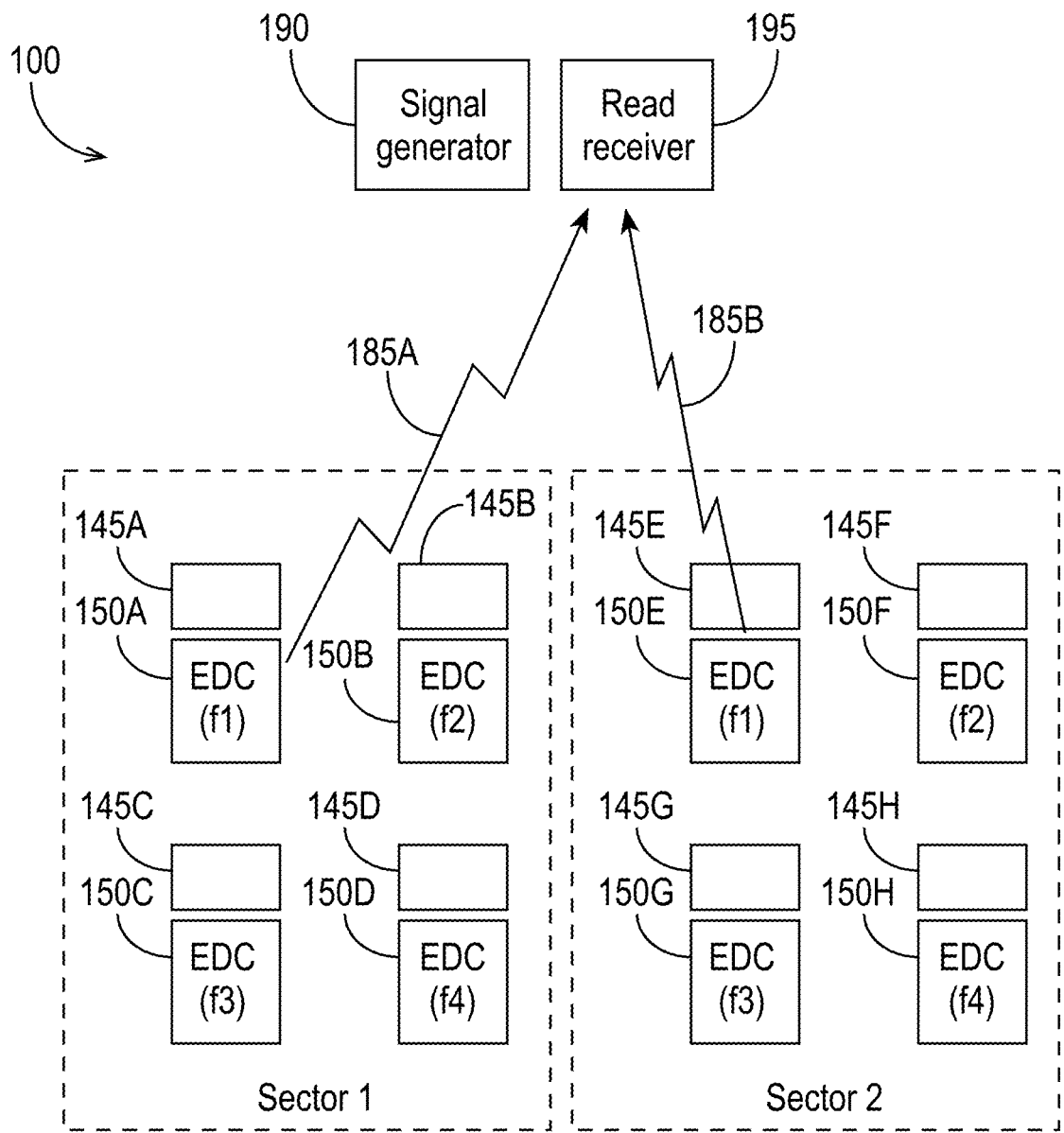

FIGS. 8A and 8B illustrate reading from an EDC-assisted storage location 145 in accordance with some embodiments. In operation, the signal generator 190 generates and transmits an activation signal 180. As explained above, if the transmitter of the signal generator 190 is located on or in a slider 525 that flies over the media, the activation signal 180 may be in close proximity to the EDC 150 intended to be activated. In such embodiments, the activation signal 180 may activate only the intended EDC 150. In some embodiments, the transmitter of the signal generator 190 is not in close proximity to the EDC 150 to be activated, and there is a risk of activating unintended EDC 150. FIG. 8A illustrates a situation in which both EDC 150A in Sector 1 and EDC 150E in Sector 2 are activated by the activation signal 180, which has a frequency f1.

As shown in FIG. 8B, in response to the activation signal 180, both EDC 150A, in Sector 1, and EDC 150E, in Sector 2, determine the contents of their respective EDC-assisted storage locations 145A, 145E and transmit wireless signals representing the contents to the read receiver 195. The wireless signals may also provide other information, such as, for example, information indicating the identity (e.g., address or other identifying information) or location (e.g., exact or approximate, sector, etc.) of the EDC-assisted storage location 145A, 145E or of the EDC 150A, 150E. EDC 150A transmits the read response signal 185A, representing the contents of EDC-assisted storage location 145A (and possibly other information), and EDC 150E transmits the read response signal 185B, representing the contents of EDC-assisted storage location 145E. (As explained previously, the read response signals 185 may report the contents of more than one EDC-assisted storage location 145, and/or they may include other information, such as, for example, information indicating or allowing the read receiver 195 to determine the location and/or identity of the EDC(s) 150 and/or the EDC-assisted storage locations 145.)

The read receiver 195 may be located in or on a slider 525 that flies over the media, or it may be positioned in a location away from the media. In embodiments in which the read receiver 195 is located in or on the slider 525, the read receiver 195 may detect only the desired read response signal 185A, or it may detect both the desired read response signal 185A and the unwanted read response signal 185B.

Similarly, in embodiments in which the read receiver 195 is in a location remote from the media, the read receiver 195 may receive both read response signals 185A and 185B. The read receiver 195 can apply signal processing techniques to extract the desired read information (e.g., the contents of the EDC-assisted storage location 145A) from the aggregate received signal when more than one EDC 150 transmits a read response signal 185.

To assist the read receiver 195 to distinguish between read response signals 185 from different EDC 150 and to extract the desired information, the EDC 150 may transmit read response signals 185 that have different characteristics. For example, referring to FIG. 8B, the read response signal 185A may have a different characteristic (e.g., frequency, modulation, etc.) than the read response signal 185B. The read receiver 195 may include or have access to a listing or database of EDC 150 read response signal 185 characteristics (e.g., a look-up table) and may be capable of configuring itself to receive the target EDC 150's read response signal 185 (e.g., by tuning its receive circuitry to a particular frequency, by looking for a particular pattern/modulation, etc.). As just one example, the read receiver 195 may know that EDC 150A responds to activation signals 180 having a frequency f1 and transmits read response signals 185 at a first frequency or with a first modulation characteristic, whereas EDC 150E responds to activation signals 180 having a frequency f1 and transmits read response signals 185 at a second frequency or with a second modulation characteristic. By tuning its receiver to look for read response signals 185 at the first frequency or with the first modulation characteristic, the read receiver 195 can distinguish the read response signal 185A from the read response signal 185B.

Figure 9:
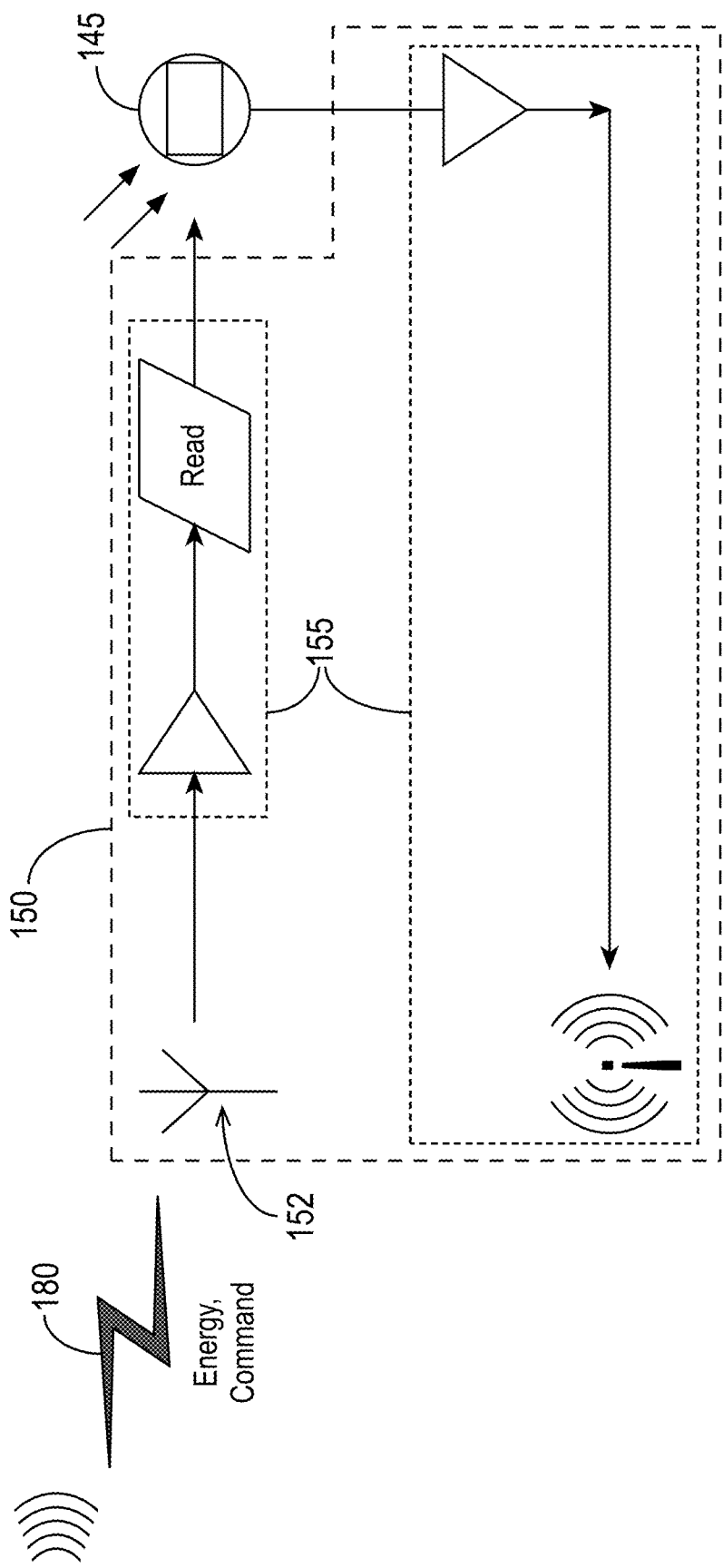
FIG. 9 is a diagram illustrating an EDC in accordance with some embodiments.

FIG. 9 is a block diagram illustrating an EDC 150. To obtain the contents of one or more EDC-assisted storage locations 145 in an EDC-assisted recording layer 225 of the media, the signal generator 190 (or, collectively, multiple ones) of the storage device directs an RF activation signal 180 having suitable characteristics to activate a desired EDC 150 within the EDC-assisted recording layer 225 toward the EDC 150. The activation signal 180 causes the EDC antenna 152 to generate power for the EDC's read circuitry 164. The read circuitry 164 interrogates one or more EDC-assisted storage locations 145 near the EDC 150 and constructs a response signal 185 for wireless transmission to the read receiver 195.

As explained above, the interrogation mechanisms may be implemented in a number of ways, including using magneto-resistive sensors used by conventional disk drives adapted for this application. The response signal 185 provides information to convey the contents of the interrogated one or more EDC-assisted storage locations 145. The response signal 185 may also include bits identifying the location(s) of the interrogated EDC-assisted storage location (s) 145. For example, the response signal 185 may have a format that includes a header identifying the address or location of the interrogated EDC-assisted storage location(s) 145 and/or activated EDC 150 followed by a body that reports the contents of the interrogated EDC-assisted storage location(s) 145. As another example, the response signal 185 may have a format that itself varies depending on the address or location of the interrogated EDC-assisted storage location (s) 145 and/or activated EDC 150. In addition, or alternatively, the reader may use triangulation techniques to identify the EDC 150 responding to a read request or to identify the locations of the EDC-assisted storage location(s) 145 being read. If the EDC 150 transmits a read response signal 185 that includes the contents of interrogated EDC-assisted storage location(s) 145 that the signal generator 190 did not request, the reader may extract or reconstruct (e.g., decode) only the desired information from the response signal 185.

Because the EDC 150 transmit the contents of the EDC-assisted storage locations 145 wirelessly, it is desirable to ensure that the EDC 150 respond only to energy from within the data storage device 100. For example, the chassis of the data storage device 100 may be shielded to prevent stray activation signals 180 from entering the data storage device and read response signals 185 from exiting the data storage device 100.

Figure 10:
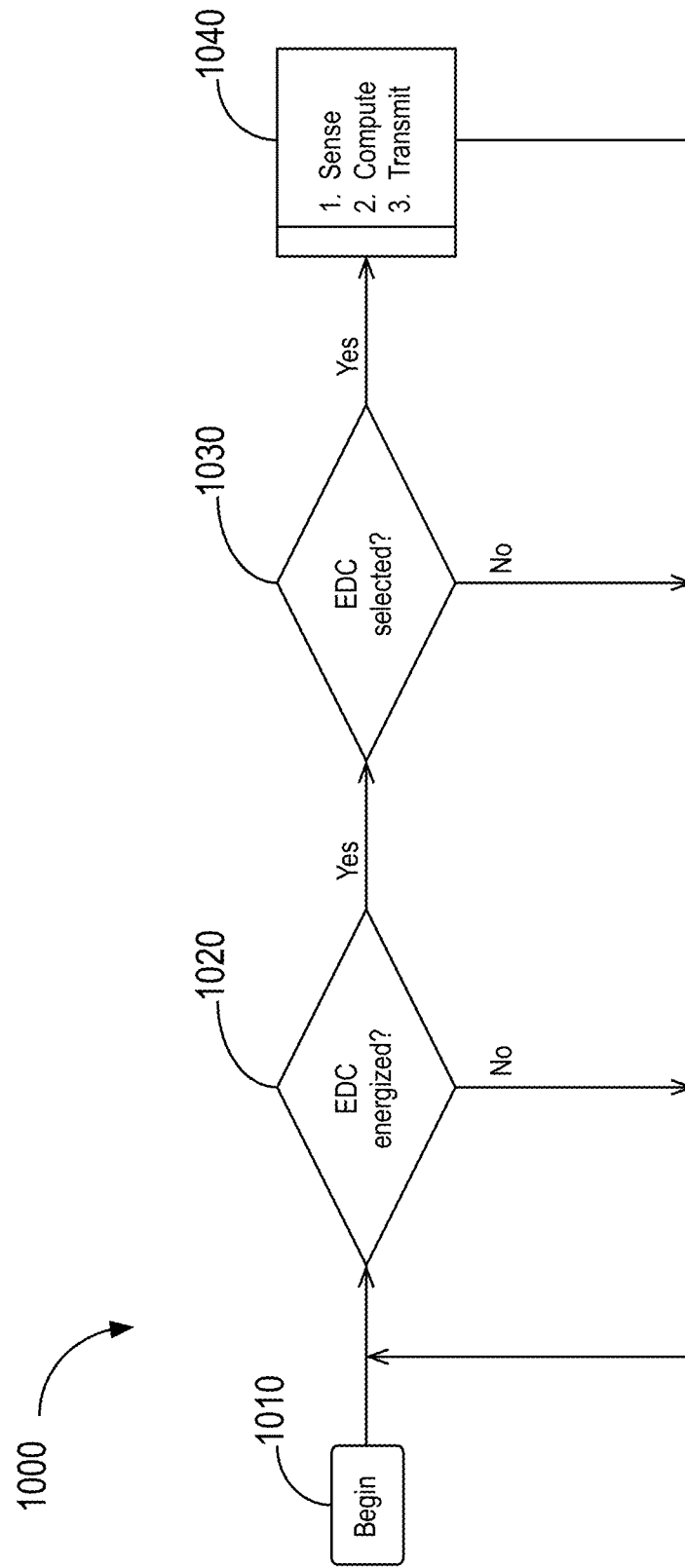
FIG. 10 is a flowchart illustrating the process to read one or more EDC-assisted storage locations using EDC in accordance with some embodiments.

FIG. 10 is a flowchart illustrating an exemplary process 1000 to read an EDC-assisted storage location 145 (or more than one EDC-assisted storage location 145) using EDC 150. At 1010, the process begins. At 1020, whether the EDC 150 is energized is determined. If the EDC 150 is energized, the process proceeds to 1030, where it is determined whether the EDC 150 is selected. If so, the process proceeds to 1040, where the contents of at least one EDC-assisted storage location 145 are sensed, computed, and transmitted.

Figure 11:
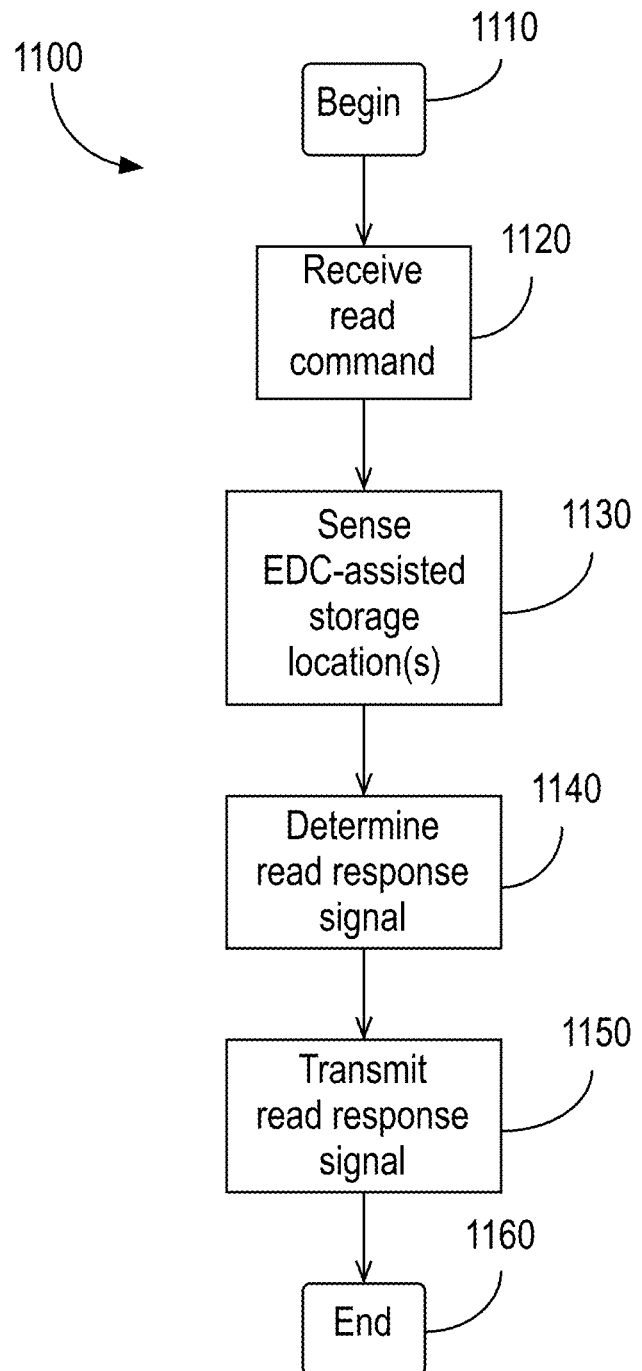
FIG. 11 illustrates a process performed by an EDC to read one or more EDC-assisted storage locations in accordance with some embodiments.

FIG. 11 illustrates a process 1100 performed by an EDC 150 to read an EDC-assisted storage location 145 (or multiple EDC-assisted storage locations 145). At 1110, the process begins. At 1120, the EDC 150 receives, wirelessly, a read command (e.g., via an activation signal 180). The read command instructs the EDC 150 to read one or more EDC-assisted storage locations 145 and to report the contents. At 1130, the EDC 150 senses one or more EDC-assisted storage locations 145 in response to the read command. At 1140, the EDC 150 determines the read response signal 185, which reports the contents of the sensed one or more EDC-assisted storage locations 145. In some embodiments, the read response signal 185 may also include information identifying the EDC 150 or the sensed EDC-assisted storage location 145. For example, this information may include the location(s) or address(es) of the sensed EDC-assisted storage location(s) 145 and/or the EDC 150. At 1150, the EDC 150 wirelessly transmits the read response signal 185 to the reader. At 1160, the process ends.

Figure 12:
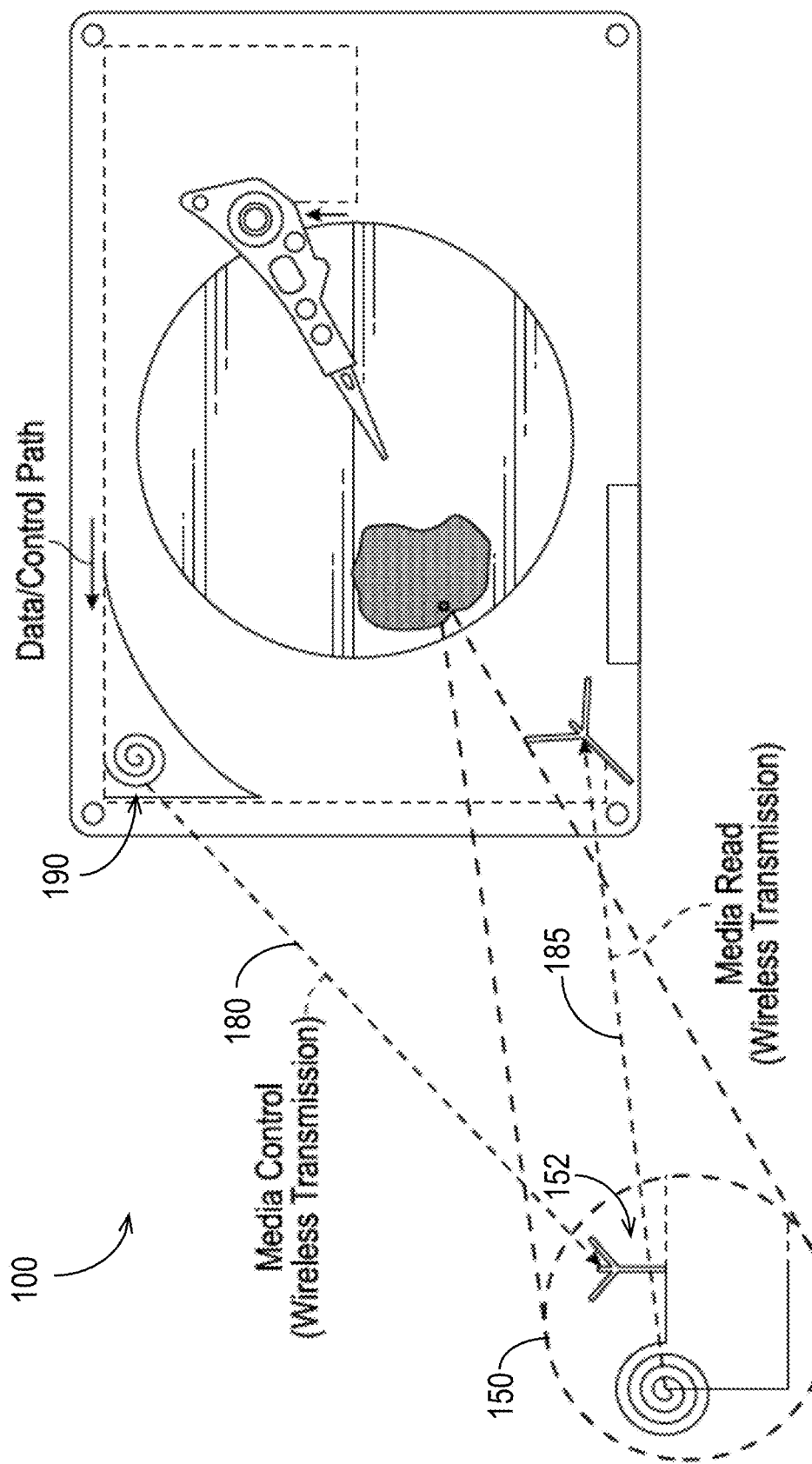
FIG. 12 illustrates the use of EDC in the context of reading from and writing to a hard disk drive in accordance with some embodiments.

FIG. 12 illustrates the use of EDC 150 in the context of reading from and writing to a hard disk drive 500. FIG. 12 shows the communication paths between the read/write circuitry and the EDC 150; the storage locations are not illustrated at the microscopic level in FIG. 12.

There are many benefits of using EDC 150 to read from a storage media. For example, the use of EDC 150 can eliminate the need for a read head on the slider 525. Furthermore, because, in some embodiments, the EDC 150 transmit wireless signals to report the contents of EDC-assisted storage locations 145, the storage device 100 does not need to spin the media to read the stored data. In addition, the storage device 100 does not need to provide power to EDC-assisted storage locations 145 that are not being read. Moreover, the use of EDC 150 provides a way to read not only the conventional recording layer 260, but also the EDC-assisted recording layer(s) 225 of the media.

Additional Applications

In addition to hard disk drive applications, in which EDC 150 may be added to a hard disk 520 to increase the data storage capacity of the disk 520, the techniques disclosed herein may be used advantageously in archival storage systems. Archival storage systems store data that is not used often but might need to be accessed in the future, or data that must be kept for regulatory compliance purposes. In some embodiments, an archival storage system uses media with EDC 150 as discussed above.

Figure 13:
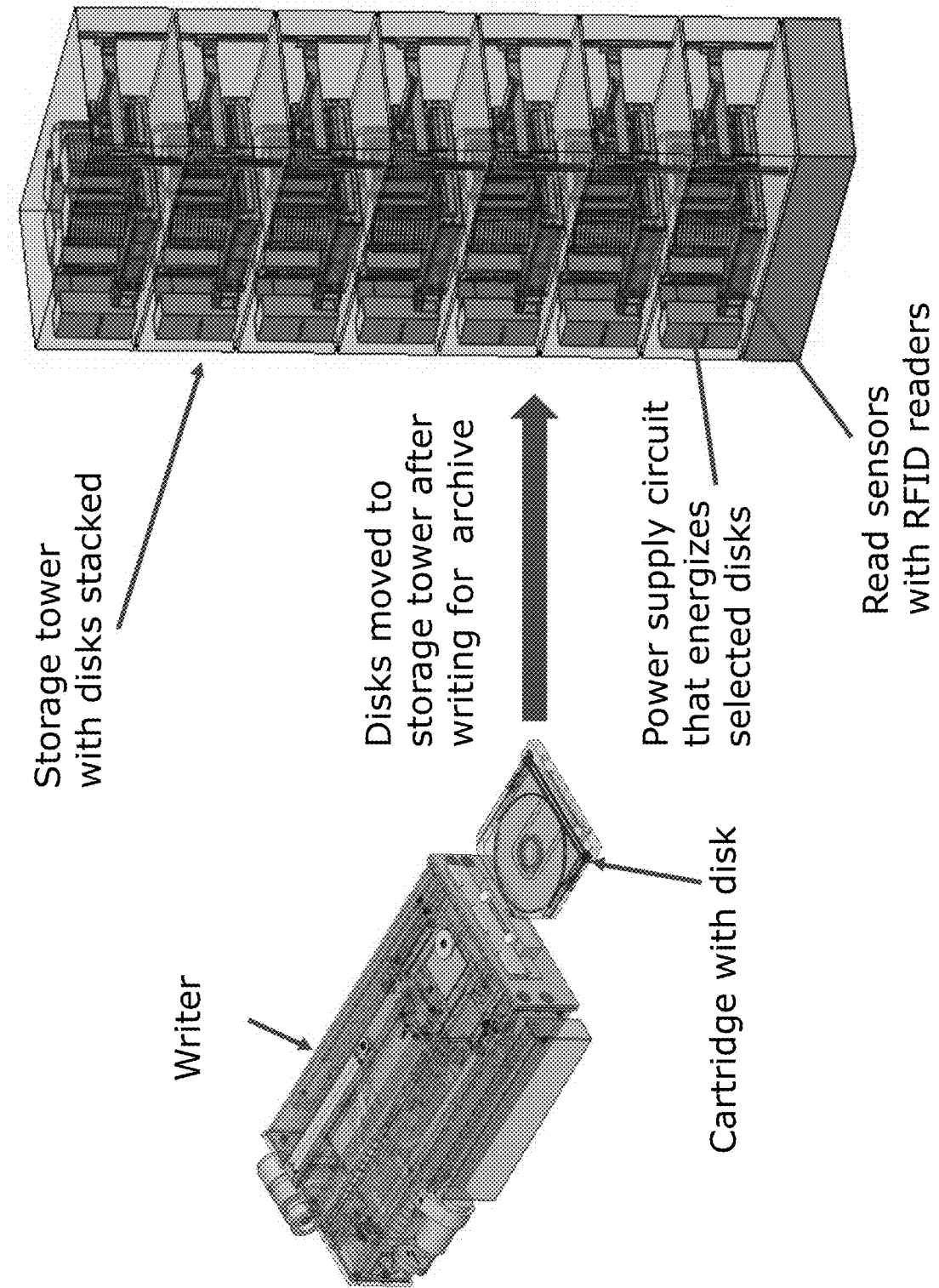
FIG. 13 illustrates an exemplary archival storage system in accordance with some embodiments.

FIG. 13 illustrates an archival storage system in accordance with some embodiments. In contrast to a hard disk drive, in which the reader and writer are both within the storage device, the archival storage system's writer and reader are physically separated. As shown in FIG. 13, the writer may be incorporated in a first device that accepts a cartridge into which a media (e.g., a disk with EDC 150) is inserted. After the data has been written to the media, the media may be moved to a different physical location for storage and, if necessary, reading at a later time. For example, as shown in FIG. 13, the media may be moved to a storage tower in which the media are closely stacked. The storage tower may house hundreds of media. The storage tower includes one or more readers that, as described above, generate RF activation signals 180 having suitable characteristics to activate desired EDC 150 within the EDC-assisted recording layers 225 of the media and receive from the EDC 150 the results of the interrogations of the EDC-assisted storage locations 145 (as described above). Each shelf of the storage tower may include a separate reader (or multiple ones), or a single reader (or multiple ones collectively) may be capable of reading from media on more than one shelf. The storage tower may also include a power supply circuit that provides power (e.g., selectively if the storage tower includes multiple readers) to individual readers in the storage tower.

The use of EDC 150 in archival storage systems eliminates the need to spin a disk to read archived data. Therefore, less space is required for the media because there is no need for a conventional read head, slider, or armature. Consequently, large numbers of disks may be stored in close proximity while still allowing their contents to be read using the EDC 150 and the techniques disclosed herein.

It is to be understood that although the archival data storage system shown and described herein suggests the use of disks with EDC 150, there is no requirement that the system use media of any particular size or shape. The techniques disclosed herein apply to all media in which EDC 150 have been scattered, distributed, embedded, or incorporated. For example, the media may have shapes other than round, and they may be thicker or thinner than conventional hard disks.

In the foregoing description and in the accompanying drawings, specific terminology has been set forth to provide a thorough understanding of the disclosed embodiments. In some instances, the terminology or drawings may imply specific details that are not required to practice the invention.

Although this document explains aspects of certain embodiments in the context of data storage devices, using hard disk drives as examples of data storage devices, the disclosures herein are not limited to use in data storage device applications. Specifically, the various embodiments are applicable to other electronic devices storage needs. Furthermore, although certain embodiments are explained in the context of hard disk drives, and some of the drawings show a hard disk drive as an example data storage device, the various embodiments may be applicable to other data storage devices such as solid state drives, solid state hybrid disk drives, optical disk drives, tape drives, and the like.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the description, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature (e.g., a layer of a media) with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A magnetic storage media, comprising:
   a recording layer comprising a storage location; and
   an embedded disconnected circuit (EDC) layer situated above or below the recording layer, the EDC layer comprising an EDC embedded entirely within the EDC layer, wherein the EDC is configured to assist in at least one of writing to or reading from the storage location in response to a wireless activation signal, wherein the EDC is disconnected from the storage location.

2. The magnetic storage media recited in claim 1, wherein the EDC is a frequency-selective circuit.

3. The magnetic storage media recited in claim 1, wherein the EDC comprises an antenna.

4. The magnetic storage media recited in claim 3, wherein the EDC further comprises a read sensor.

5. The magnetic storage media recited in claim 4, wherein a resistance of the read sensor is configured to vary in response to a magnetization of the storage location.

6. The magnetic storage media recited in claim 4, wherein the read sensor comprises a magnetic tunnel junction.

7. The magnetic storage media recited in claim 4, wherein the read sensor is a magnetoresistive sensor.

8. The magnetic storage media recited in claim 4, wherein the EDC is further configured to read, using the read sensor, contents of the storage location.

9. The magnetic storage media recited in claim 8, wherein the EDC further comprises transmitting circuitry configured to wirelessly transmit, via the antenna, a response signal providing information about the contents of the storage location.

10. The magnetic storage media recited in claim 9, wherein the response signal further provides an indication of a location or identity of the EDC.

11. The magnetic storage media recited in claim 9, wherein the response signal further provides an indication of a location or identity of the storage location.

12. The magnetic storage media recited in claim 3, wherein the EDC further comprises a resistive element, a resonator, or a heat generator coupled to the antenna.

13. The magnetic storage media recited in claim 3, wherein the EDC further comprises an active circuit coupled to the antenna, wherein the active circuit is configured to generate an electromagnetic field from energy received by the antenna.

14. The magnetic storage media recited in 13, wherein the active circuit is further configured to generate the electromagnetic field using a spin-transfer torque.

15. The magnetic storage media recited in claim 3, wherein the EDC further comprises a spin-torque oscillator.

16. The magnetic storage media recited in claim 1, wherein the recording layer is a first recording layer, and further comprising a second recording layer.

17. The magnetic storage media recited in claim 16, further comprising an isolation layer disposed between the EDC layer and the second recording layer.

18. The magnetic storage media recited in claim 16, wherein the storage location is a first storage location, the EDC is a first EDC, and the wireless activation signal is a first wireless activation signal, and wherein the second recording layer comprises a second storage location, and further comprising:
a second EDC configured to assist in at least one of writing to or reading from the second storage location in response to a second wireless activation signal.

19. The magnetic storage media recited in claim 18, wherein the EDC layer is a first EDC layer, and wherein the second EDC is disposed in a second EDC layer of the magnetic storage media.

20. The magnetic storage media recited in claim 18, wherein the first and second wireless activation signals differ in at least one characteristic.

21. The magnetic storage media recited in claim 20, wherein the at least one characteristic comprises a wireless activation signal frequency.

22. The magnetic storage media recited in claim 16, wherein a characteristic of the first recording layer differs from a corresponding characteristic of the second recording layer.

23. The magnetic storage media recited in claim 22, wherein the characteristic of the first recording layer is a recording density.

24. The magnetic storage media recited in claim 22, wherein the storage location is a first storage location, and wherein the characteristic of the first recording layer is a dimension of the first storage location, and the corresponding characteristic of the second recording layer is a dimension of a second storage location in the second recording layer.

25. The magnetic storage media recited in claim 22, wherein the characteristic of the first recording layer is a coercivity.

26. The magnetic storage media recited in claim 1, wherein the storage location is a first storage location, the EDC is a first EDC, and the wireless activation signal is a first wireless activation signal, and further comprising:
a second storage location; and
a second EDC configured to assist in at least one of writing to or reading from the second storage location in response to a second wireless activation signal, wherein a characteristic of the second wireless activation signal differs from a corresponding characteristic of the first wireless activation signal.

27. The magnetic storage media recited in claim 26, wherein the characteristic is a frequency, and wherein the first and second EDC are frequency-selective circuits, and wherein:
the first wireless activation signal has a first frequency configured to activate the first EDC but not the second EDC, and
the second wireless activation signal has a frequency configured to activate the second EDC but not the first EDC.

28. The magnetic storage media recited in claim 26, wherein the second storage location is in the recording layer.

29. The magnetic storage media recited in claim 26, wherein the recording layer is a first recording layer, and wherein the magnetic storage media further comprises a second recording layer, and wherein the second storage location is in the second recording layer.

30. A magnetic storage system, comprising:
a signal generator configured to generate a wireless activation signal;
a write transducer; and
a magnetic storage media, comprising:
a recording layer comprising a plurality of storage locations, and
an embedded disconnected circuit (EDC) layer situated above or below the recording layer, the EDC layer comprising at least one EDC embedded entirely within the EDC layer, wherein the at least one EDC is configured to assist the write transducer to write to at least one of the plurality of storage locations in response to the wireless activation signal, wherein none of the plurality of storage locations is connected to any of the at least one EDC.

31. The magnetic storage system recited in claim 30, wherein the recording layer is a first recording layer and the plurality of storage locations is a first plurality of storage locations, and wherein the magnetic storage media further comprises a second recording layer comprising a second plurality of storage locations, wherein the second recording layer is closer than the first recording layer to the write transducer.

32. The magnetic storage system recited in claim 31, wherein a recording density of the second recording layer is higher than a recording density of the first recording layer.

33. The magnetic storage system recited in claim 30, wherein the at least one EDC comprises a first EDC and a second EDC, and the at least one of the plurality of storage locations is a first at least one of the plurality of storage locations, and the wireless activation signal is a first wireless activation signal, and wherein:

the signal generator is further configured to generate a second wireless activation signal, wherein a characteristic of the first wireless activation signal differs from a corresponding characteristic of the second wireless activation signal, and the second EDC is configured to assist the write transducer to write to a second at least one of the plurality of storage locations in response to the second wireless activation signal.

34. The magnetic storage system recited in claim 33, wherein the characteristic of the first wireless activation signal is a first frequency and the corresponding characteristic of the second wireless activation signal is a second frequency, and wherein the first and second EDC are frequency-selective circuits, and wherein:

the first EDC is configured to activate in response to the first wireless activation signal but not the second wireless activation signal, and the second EDC is further configured to activate in response to the second wireless activation signal but not the first wireless activation signal.

35. The magnetic storage system recited in claim 30, wherein the signal generator is further configured to transmit the wireless activation signal to the at least one EDC.

36. The magnetic storage system recited in claim 35, wherein the signal generator comprises a directional antenna.

37. A magnetic storage system, comprising:

a signal generator configured to generate a wireless activation signal;

a read receiver; and a magnetic storage medium, comprising:

a recording layer comprising a plurality of storage locations; and an embedded disconnected circuit (EDC) layer situated above or below the recording layer, the EDC layer comprising at least one EDC embedded entirely within the EDC layer, wherein the at least one EDC is configured to assist in providing an indication of contents of at least one of the plurality of storage locations to the read receiver in response to the wireless activation signal, wherein none of the plurality of storage locations is connected to any of the at least one EDC.

38. The magnetic storage system recited in claim 37, wherein assist in providing the indication of the contents of the at least one of the plurality of storage locations to the read receiver in response to the wireless activation signal comprises:

receive the wireless activation signal;

determine the contents of the at least one of the plurality of storage locations in response to the wireless activation signal; and transmit a read response signal to the read receiver, wherein the read response signal provides the indication of the contents of the at least one of the plurality of storage locations.

39. The magnetic storage system recited in claim 38, wherein the read response signal further provides an indication of an identity or location of the at least one EDC.

40. The magnetic storage system recited in claim 38, wherein the read response signal further provides an indication of an identity or location of the at least one of the plurality of storage locations.

41. The magnetic storage system recited in claim 37, wherein the at least one EDC comprises a first EDC and a second EDC, and the at least one of the plurality of storage locations is a first at least one of the plurality of storage locations, and the wireless activation signal is a first wireless activation signal, and wherein:

the signal generator is further configured to generate a second wireless activation signal, wherein a characteristic of the first wireless activation signal differs from a corresponding characteristic of the second wireless activation signal, and the second EDC is configured to assist in providing an indication of contents of a second at least one of the plurality of storage locations in response to the second wireless activation signal.

42. The magnetic storage system recited in claim 41, wherein the characteristic of the first wireless activation signal is a first frequency and the corresponding characteristic of the second wireless activation signal is a second frequency, and wherein the first EDC and the second EDC are frequency-selective circuits, and wherein:

the first EDC is configured to activate in response to the first frequency but not the second frequency, and the second EDC is further configured to activate in response to the second frequency but not the first frequency.

43. The magnetic storage system recited in claim 37, wherein the signal generator is further configured to transmit the wireless activation signal to the at least one EDC.

44. The magnetic storage system recited in claim 43, wherein the signal generator comprises a directional antenna.

45. The magnetic storage system recited in claim 37, further comprising a slider, and wherein the read receiver is disposed in or on the slider.

* * * * *